(12) United States Patent
Robinson

(10) Patent No.: US 7,780,767 B2
(45) Date of Patent: Aug. 24, 2010

(54) CONDENSATION PROCESS AND CONDENSER

(76) Inventor: James Andrew Robinson, Lydstone, 12 Magnolia Rise, Presbury, Macclesfield, Cheshire (GB) SK10 4US ( * ) Notice: Subject to any disclaimer, the term of this patent is extended or adjusted under 35 U.S.C. 154(b) by 939 days.

(21) Appl. No.: 10/553,541

(22) PCT Filed: Apr. 7, 2004

(86) PCT No.: PCT/GB2004/001511

§ 371 (c)(1),
(2), (4) Date: Oct. 26, 2006

(87) PCT Pub. No.: WO2004/091752

PCT Pub. Date: Oct. 28, 2004

(65) Prior Publication Data

US 2007/0089445 A1  Apr. 26, 2007

(30) Foreign Application Priority Data

Apr. 15, 2003  (GB)  .................................. 0308657.6

(51) Int. Cl.
*B01D 53/00* (2006.01)
(52) U.S. Cl. ............. 95/288; 55/466; 55/DIG. 15; 62/55.5; 165/114; 165/DIG. 207
(58) Field of Classification Search ............. 55/466, 55/DIG. 15; 96/417; 95/288; 62/55.5; 165/114, 165/DIG. 207
See application file for complete search history.

(56) References Cited

U.S. PATENT DOCUMENTS

| 1,585,640 | A | * | 5/1926 | Bancel | ........................ 165/114 |
| 1,941,650 | A | * | 1/1934 | Baumann | .................... 165/114 |
| 3,884,768 | A | | 5/1975 | Griffith | |
| 5,231,836 | A | | 8/1993 | Saari | |

FOREIGN PATENT DOCUMENTS

DE  42 39 021 A1  5/1994

(Continued)

OTHER PUBLICATIONS

Robinson, J.A., et al. "Measurement of condensation heat transfer coefficients in a steam chamber using a variable conductance heat pipe" Second UK National Conference on Heat Transfer, Sep. 14, 1988, vol. 1, Sessions 1A-3D, Institution of Mechanical Engineers.
Rose, J.W. "Condensation of a Vapour in the Presence of a Non-Condensing Gas" Int. J. Heat Mass Transfer, vol. 12, 1969, pp. 233-237 Great Britain.

(Continued)

*Primary Examiner*—Robert A Hopkins
(74) *Attorney, Agent, or Firm*—Woodard Emhardt Moriarty McNett & Henry

(57) ABSTRACT

A condenser and a containment vessel adapted to efficiently condense a gas out of a mixture of condensing and non-condensing gases. In condensers, the fraction of gas within a condenser made up of non-condensing gases can be significantly reduced by withdrawing gas from localised regions of relatively low temperature where the mass fraction of non-condensing gases will be relatively high. In containment vessels, pressures can be reduced by providing a large surface area of the liquid into which the condensing gas condenses in a relatively cool region of the containment vessel. Both these effects result from an appreciation of the manner in which non-condensing gases tend to accumulate in regions which are relatively cold.

22 Claims, 16 Drawing Sheets

FOREIGN PATENT DOCUMENTS

| | | |
|---|---|---|
| EP | 0 553 706 A1 | 1/1993 |
| EP | 0 691 156 A2 | 1/1996 |
| EP | 0 691 156 A3 | 6/1997 |
| EP | 0 856 714 A2 | 8/1998 |
| EP | 0 856 714 A3 | 4/1999 |
| GB | 669 104 A | 3/1952 |

OTHER PUBLICATIONS

Collier, John G. 1981. Convective boiling and condensation, Chapter 10, ISBN 0-07-011798-5, New York: McGraw-Hill International Book Co.

\* cited by examiner

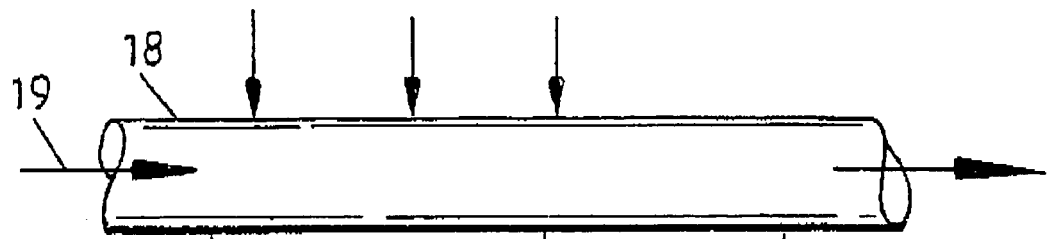
FIG. 9A
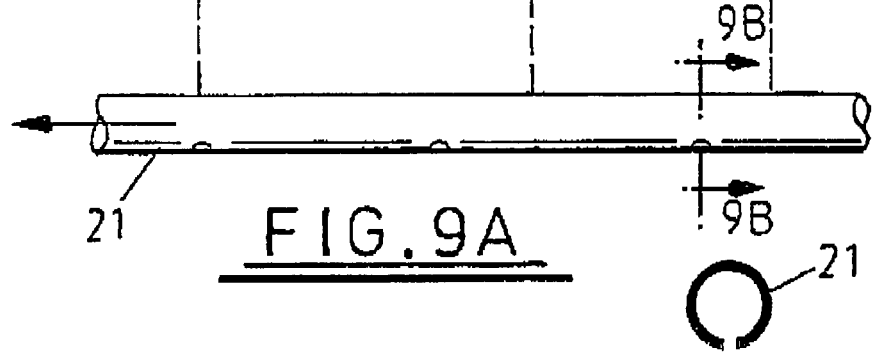
FIG. 9B
FIG. 9C
FIG. 9D
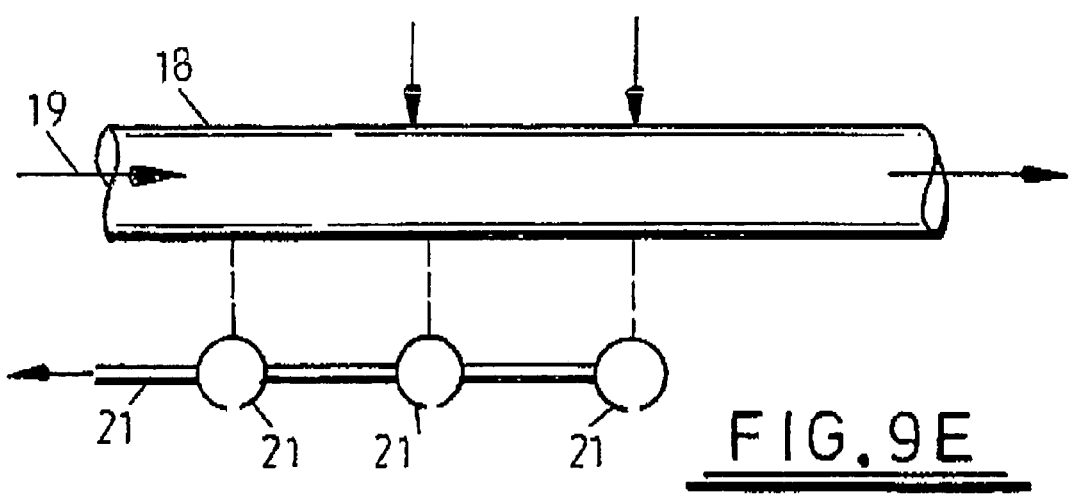
FIG. 9E

CONDENSATION PROCESS AND CONDENSER

CROSS-REFERENCE TO RELATED APPLICATIONS

This application is a national filing from International Application No. PCT/GB2004/001511, filed 7 Apr. 2004. Applicants also claim foreign priority benefits under 35 U.S.C. §119 to U.K. Application GB0308657.6, filed 15 Apr. 2003. Both of these applications are incorporated herein by reference.

FIELD OF THE INVENTION

The present invention relates to condensers and methods for enhancing the efficiency of condensers. Various embodiments of the invention are applicable to the condensation of a first gas that is mixed with at least one second gas having a lower boiling point than the first gas. Various embodiments of the present invention are applicable in particular to steam condensers of the type used in electric power generation, but is also applicable in any circumstances in which a gas is being condensed from a mixture of gases.

BACKGROUND OF THE INVENTION

It has been well known for many years that the rate at which the gas in a mixture of gases condenses is reduced by the presence of non-condensing gases in the mixture. The problem has been recognised by manufacturers of condensers for steam turbines used in electricity generation, and by manufacturers of many other types of plant. Condensation heat transfer is however difficult to measure as it is a rapid and violent process in which a large quantity of heat is transferred through an interface across which the temperature difference is intentionally small.

The physics of condensation of a pure gas is well known. This condensation process can best be understood by considering the simple situation of a flow of pure gas normal to a vertical surface that is maintained at a constant temperature by a cooling system such that the gas condenses on the vertical surface. Once equilibrium has been established, at every location on the surface a film of condensate forms at a rate that is constant. The condensate runs down the surface under gravity but once equilibrium has been established at any given location the film of condensate is of a constant thickness. Substantially, the variation in temperature in the bulk gas normal to the surface is negligible, and so the temperature difference between the bulk gas and the vertical surface is entirely across the thickness of the condensate film. These physical processes are sufficiently well understood to enable the design of simple heat exchangers for condensing pure gases without referring to empirical correlations.

It will be appreciated that generally the gas flow towards a cooled surface in a condensation plant is not all normal to a plane vertical surface. A common arrangement is a "shell and tube" structure which has a "nest" of parallel horizontal tubes through each of which tubes a cooling liquid is passed. Gas condenses on the cold outer surfaces of the tubes and droplets of condensate fall from the tubes. Some of these droplets land on lower tubes, thereby increasing the thickness of the film of condensate on those tubes and increasing the resistance to heat transfer. This process, called inundation, complicates the estimation of the performance of such condensers and accordingly empirical correlations are generally used to predict the overall performance of such systems.

Whereas the physics of condensation of pure gases is relatively simple, the physics of condensation of a mixture of gases is considerably more complicated. The energy released per unit of gas condensed is of course the same for mixtures as for pure gases, but the rate at which energy can be transferred between the mixture of gases and the condensing surface is significantly reduced by the presence of the non-condensing gas or gases.

As in the case of a pure gas, when equilibrium is established, gas condenses to form a film of condensate on the heat exchange surface at a rate that is constant. Condensate runs down or falls off the surface at the same rate as it forms, and in the case of a vertical cooling surface a film of condensate is formed which is of constant thickness at any given location. It has been found however that the concentration of the non-condensing gas or gases increases in a boundary layer of gas between the bulk gas and the condensate film. This increase in the concentration of non-condensing gas results from the fact that non-condensing gas is swept towards the cooling surface with the condensing gas and accumulates adjacent the cooling surface. This increases the non-condensing gas mass fraction in the boundary layer, which restricts the flow of the condensing gas towards the condensing surface.

The problems that arise when condensing a first gas from a mixture of gases as a result of the presence of non-condensing gases have been appreciated for many years. It appears however that the practical significance of this problem has been underestimated. To assist understanding of this problem, the impact of the problem on condensing steam from a mixture of steam and air is discussed below.

If a mixture of steam and air, at the saturation temperature of the steam, flows normal to a plane vertical cooled surface maintained at a constant temperature below the boiling point of water, when the steam and air mixture arrives at the cooled surface steam condenses to form a film of water on that surface. Air in the mixture however remains in the form of molecules of its constituent gases. The presence of this air impedes the flow of more steam molecules to the surface of the water film. The rate at which air can diffuse back against the flow of steam limits the rate at which steam can flow towards the cooled surface. Thus a boundary layer forms in which the air mass fraction increases from a substantially uniform generally low value in the bulk gas to a substantially higher value at the surface of the water film. Given that the pressure of the gas mixture everywhere in the condenser is the sum of the local partial pressures of the steam and the air and that the flow distance through the boundary layer from the bulk gas to the condensate film is small, the total pressure at both sides of the boundary layer must be substantially the same. At the surface of the condensed water film, the steam must be at saturation temperature. Given that the air partial pressure at the surface of the water has increased, the steam partial pressure there has reduced. Therefore the saturation temperature of the steam there is also reduced, and a temperature difference has developed across the boundary layer.

Generally an equilibrium situation is quickly established. Thus, although with the condensation of a pure gas the variation in temperature of the bulk gas normal to the cooled surface is negligible, and the bulk gas in effect extends up to the surface of the condensate film, with a steam/air gas mixture there is a temperature difference between the bulk gas and the surface of the water film that has condensed out of the mixture. The total temperature difference between the bulk gas and the cooled surface upon which steam condenses is dropped across the total width of the boundary layer plus the condensate film, but the temperature difference across the boundary layer is substantially more significant than the temperature difference across the condensate film.

The above problem has been discussed in the context of a plane vertical cooling surface, but generally condensers do not have such a simple structure and therefore inundation further complicates the estimation of the performance of the plants. As a result many empirical correlations are generally necessary during the design of condenser plant. Although the problems encountered in condensing one gas of a mixture of gases has been described in the context of steam/air mixtures, it will be appreciated that other gas mixtures behave in a similar way.

The effects of non-condensing gas in condensers are, of course, reduced if a flow of the mixture is imposed parallel to the heat exchange surfaces. This reduces the concentration of the non-condensing gas or gases adjacent to the heat exchange surfaces. Generally the known problems associated with non-condensing gases in condensers have been addressed by imposing flows relative to the heat exchange surfaces. Nevertheless, although the principles of the processes have been understood for some time, it has not been possible readily to predict the rate at which the processes proceed with accuracy and therefore, in practical condensing plant, it has been conventional to rely upon empirical correlations when estimating the surface area required for a condenser heat exchanger. Of course, a difficulty when relying upon empirical correlations is that it is not easy to predict the performance of a "perfect" plant so the extent of any short fall of performance may not be recognised. Furthermore, if any of the correlations relied upon are not quite correct, the overall design cannot be optimum.

Further details of the effects of non-condensing gas on condensation processes are given in "Convective Boiling and Condensation", chapter 10, J G Collier, ISBN 0-07-011798-5. This includes a discussion of condensation in the present of a non-condensing gas and reports calculations of the effects of the non-condensing gas on reducing the heat transfer coefficient for both no imposed flow (also known as free convection), and for an imposed flow (also known as forced convection). "Condensation of a Vapour in the Presence of a Non-conducting Gas", J W Rose, Int J Heat Mass Transfer Vol. 12 pp 233-237 1969 compares the results of a simplified calculation method with the results for free convection.

An experiment measuring the heat transfer of interest is described in "Measurements of Condensation Heat Transfer Using a Variable Conductance Heat Pipe", J A Robinson et al, Second UK National Heat Transfer Conference, ImechE 1988. This paper describes a technique of measurement of the effect of a mixture of steam and air condensing on a vertical thin disc. Some measurements of heat transfer coefficient at different air mass fractions are plotted. The anticipated effect of an imposed velocity parallel to the condensing surface on some reduction of the dependence of the heat transfer coefficient on air mass fraction is also shown.

SUMMARY OF THE INVENTION

Some embodiments of the present invention are based on the theory discussed above and the realisation that the effect of non-condensing gases on condensation processes has been generally under-estimated, enabling surprising improvements in performance to be achieved by relatively modest modifications to current design thinking. Some embodiments of the present invention have as one of their objects the delivery of such performance improvements.

According to another embodiment of the present invention, there is provided a method for removing non-condensing gas from a mixture of condensing and non-condensing gases in a condenser, wherein gas is withdrawn from at least one location within the condenser, the location being selected to correspond to a region within the condenser in which the gas is at a temperature which is lower than the temperature of gas in other regions within the condenser.

Yet another embodiment of the present invention also provides a condenser for condensing gas in which gas is condensed to liquid on a heat exchanging surface, comprising means for withdrawing gas from within the condenser to remove non-condensing gas, the gas withdrawing means being positioned to withdraw gas from at least one location in which the gas temperature is lower than in other regions within the condenser.

The above first aspect of the present invention may include the realisation that non-condensing gases tend to accumulate in regions of a condenser which are relatively cold and therefore extracting gas from such regions results in a relatively efficient removal of non-condensing gases from the condenser.

Gas may be extracted from adjacent an arrangement designed to produce a localised region of relatively cold gas. For example, the arrangement may comprise a structure positioned so as to be cooled by condensing liquid. The structure may be in the form of a deflector located beneath the heat exchanging surface such that droplets of condensate fall onto and cool the deflector, gas being withdrawn from beneath the deflector. For example the deflector could be a simple cover extending over an upwardly extending gas withdrawal pipe, or an elongate gas withdrawal duct a lower side of which defines apertures through which gas is drawn into the duct. As a further alternative, the deflector may be a simple elongate duct an underside of which defines an open channel, gas being withdrawn from one end of the duct. The elongate duct may extend beneath and preferably in parallel with a heat exchanger tube of the condenser. A shield may be located above the deflector to shield falling droplets of condensate from gas flowing through the condenser, thereby preventing the gas flow reheating falling droplets of condensate before they strike the deflector.

In one alternative arrangement, a surface is defined within the condenser which is cooled by an external means, for example a flow of coolant in thermal contact with that surface. The surface could be cooled to a temperature lower than any other surface in the condenser. For example, primary and secondary heat exchangers could be provided in series in the flow of gas to be condensed, the secondary heat exchanger being colder than the primary heat exchanger to deliver relatively cold condensate. Condensate withdrawn from the condenser could be passed through an auxiliary heat exchanger in the condenser to heat the condensate. The cooled surface may be defined by the surface of a pool of condensed liquid in thermal contact with a cooling device. The cooling device could for example be immersed in the condensate pool.

Alternatively, the cooled surface could be defined by a wall of the condenser in thermal contact with a cooling device. For example the condenser wall could be defined by a cover plate which covers an aperture in the condenser, gas being withdrawn through the cover plate. The pressure and temperature of gas adjacent the cover plate could be monitored, the degree of cooling applied to the plate being controlled to maintain the temperature of the cover plate above the freezing point of the condensed liquid.

According to yet another aspect of some embodiments of the present invention, there is provided a method for establishing favourable temperature differences between heat exchanger conduits within a condenser and a process fluid which flows through the condenser, wherein coolant is pumped through an array of parallel heat exchanger conduits spaced apart in the direction of process fluid flow, at least two of the conduits being connected in series such that coolant flows sequentially through first and second conduits, the second conduit being located upstream of the first conduit in the direction of process fluid flow.

A further aspect of some embodiments of the present invention provide a condenser comprising an array of parallel heat exchanger conduits spaced apart in the direction of flow of a process fluid flow including a gas to be condensed, wherein at least two conduits that are spaced apart in the direction of fluid flow are connected in series such that coolant flows sequentially through first and second conduits, the second conduit being located upstream of the first conduit in the direction of process fluid flow.

A first pair of first and second conduits may be connected in series, a second pair of first and second conduits may be connected in series, the direction of flow of coolant through the condenser being in one direction for the first conduit of the first pair and the second conduit of the second pair and in the opposite direction for the second conduit of the first pair and the first conduit of the second pair, the second conduit of the first pair being located upstream in the process flow of the first conduit of the second pair, and the second conduit of the second pair being located upstream in the process flow of the first conduit of the first pair.

The parallel heat exchanger conduits may comprise parallel heat exchanger conduits.

Alternatively, the parallel heat exchanger conduits may be defined by a staggered array of baffles. Each baffle extends transverse the direction of flow of the process fluid, with alternate baffles extending from opposite sides of the condenser. The condenser further comprises an array of process fluid tubes extending through the baffles for said flow of the process fluid.

According to yet another aspect of embodiments of the present invention, there is provided a method for minimising the pressure within a containment vessel resulting from the release into the vessel of a pressurised gas which will condense to a liquid at the temperatures and pressures assumed to prevail within the containment vessel, wherein a body of the liquid of large surface area relative to the area of the vessel is established in a lower portion of the vessel.

In some embodiments this aspect of the present invention also provides a containment vessel intended to contain a release into the vessel of pressurised gas which will condense to a liquid at the temperatures and pressures assumed to prevail within the containment vessel, the containment vessel initially being filled with a gas or gases which will not condense at the temperatures and pressures assumed to prevail within the containment vessel, and the containment vessel including means for establishing in a lower portion of the vessel a body of the liquid of large surface area relative to the area of the vessel.

The body of liquid may be established in a simple open tray arranged to collect condensing liquid. Alternatively, means may be provided for releasing a stored volume of the liquid into at least one open tray to form the body of liquid. Pressure within the containment vessel may be sensed, the stored volume of liquid being released in the event of the sensed pressure exceeding a predetermined threshold.

These and other aspects of various embodiments of the present invention will be shown in the text, drawings, and claims that follow.

DESCRIPTION OF THE DRAWINGS

Embodiments of the present invention will now be described, by way of example, with reference to the accompanying drawings, in which:

FIGS. 9A to 9E represent alternative embodiments of the present invention of air extract devices to that shown in FIG. 8;

DESCRIPTION OF THE PREFERRED EMBODIMENT

Figure 1:
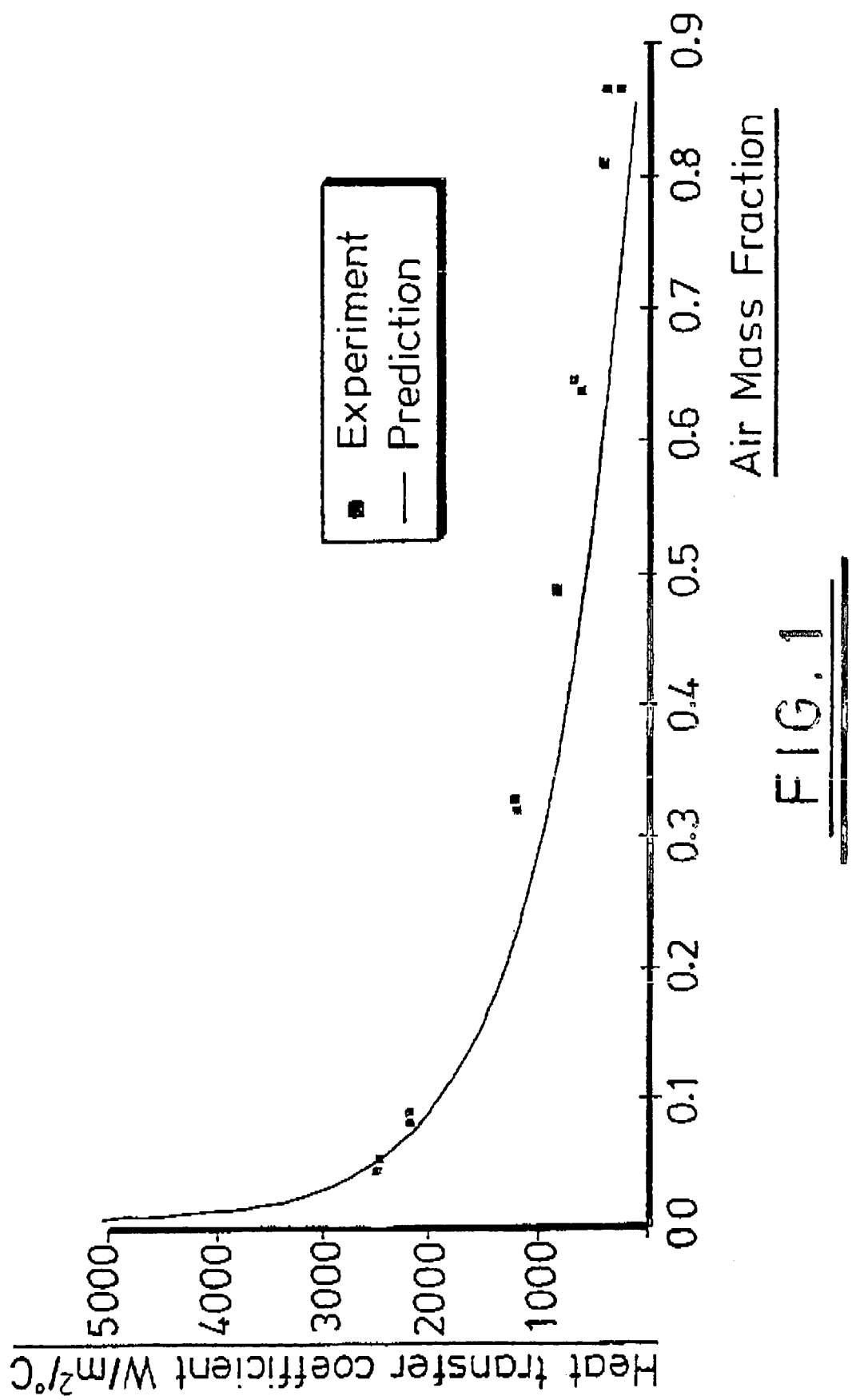
FIGS. 1 to 3 present information derived from the theory discussed above illustrating the effect of non-condensing gases on condensation processes, FIG. 1 showing the relationship between heat transfer coefficient and air mass fraction for a mixture of steam and air condensing on a vertical thin disc, FIG. 2 showing the relationship between heat transfer coefficient and air mass fraction at reduced pressures, and FIG. 3 showing the relationship between the fraction of the temperature difference between the bulk steam/air mixture and the cooled surface which arises across the condensate film.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
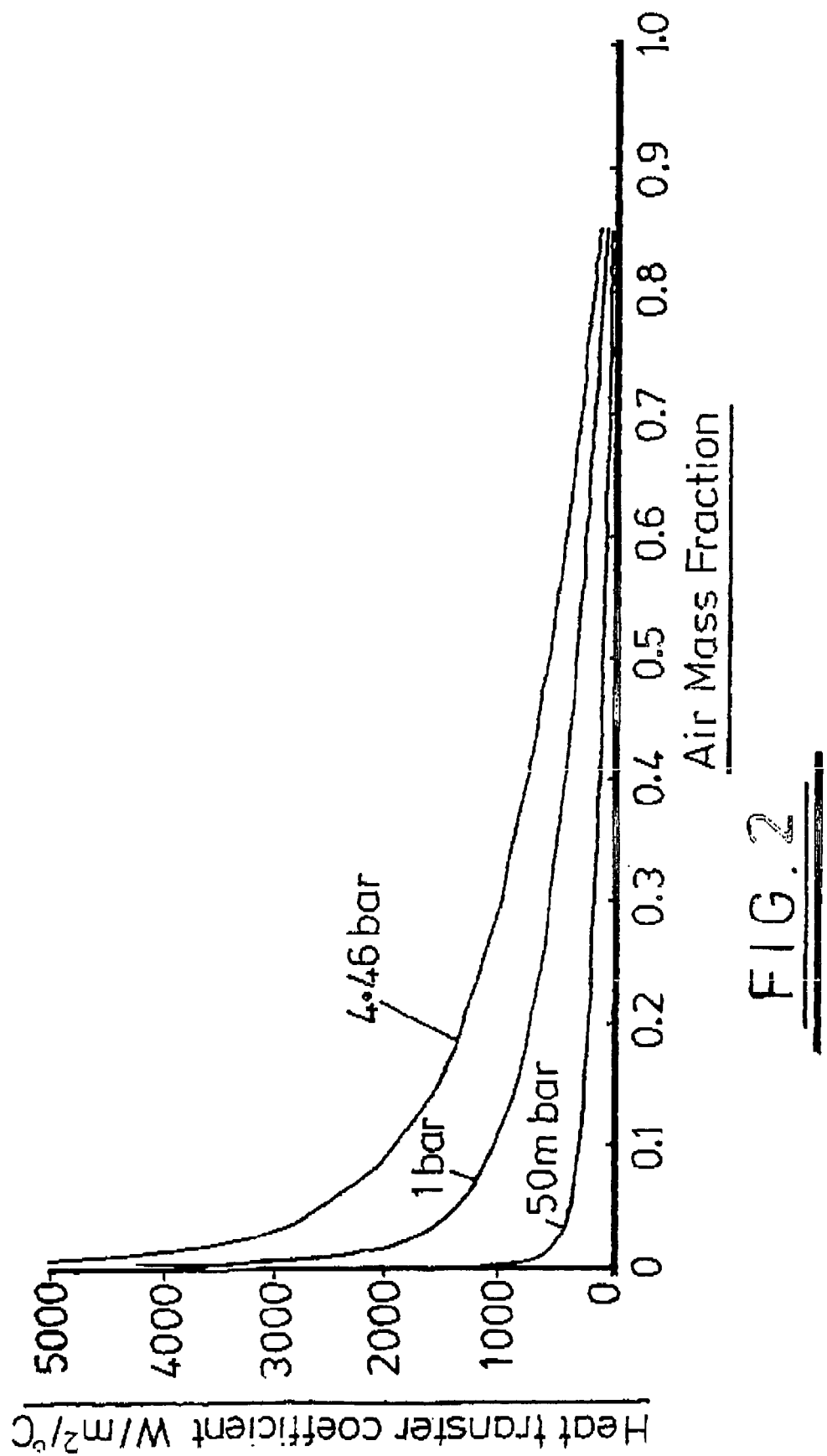
Figure 3:
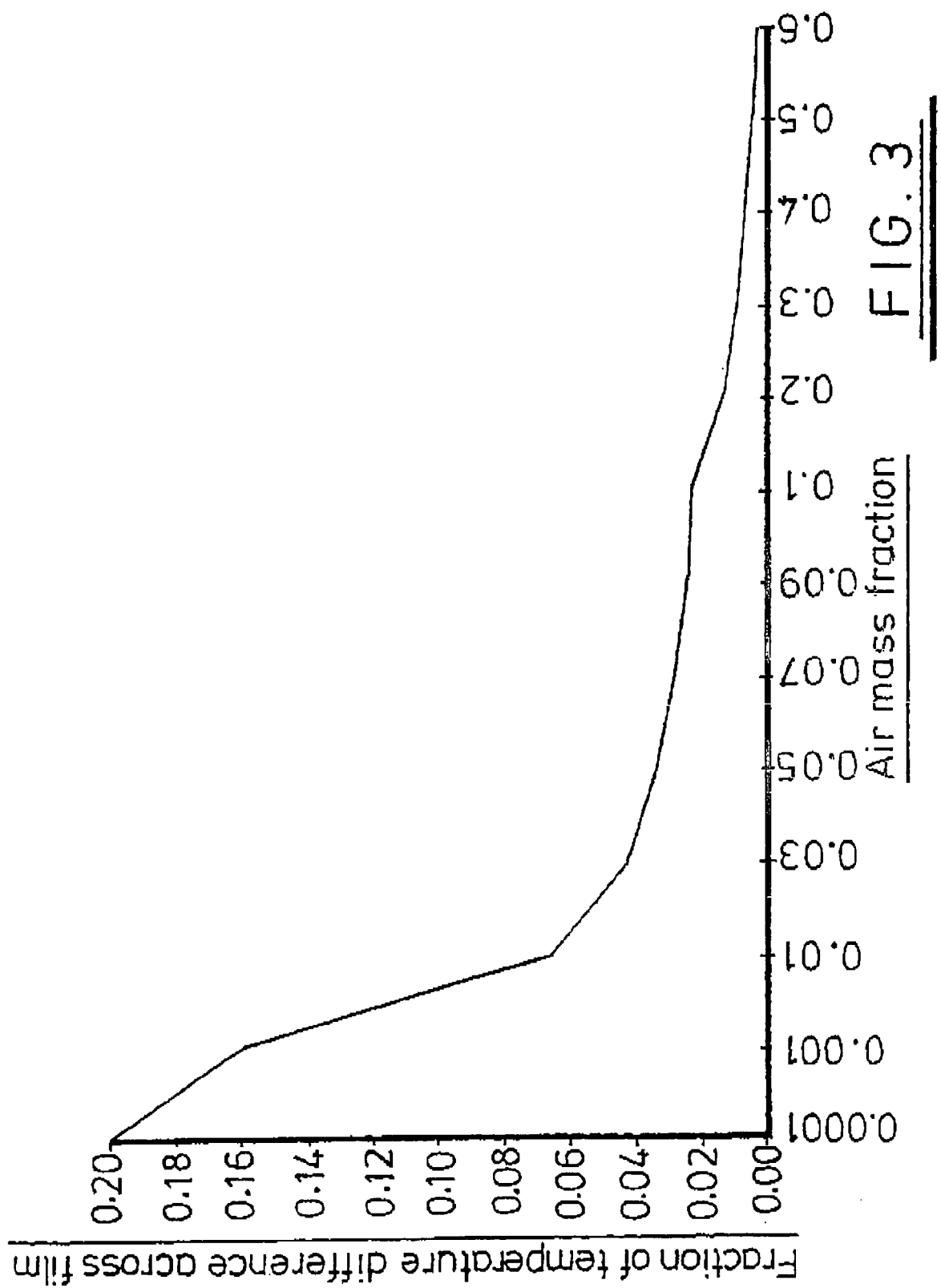

Referring to FIGS. 1 to 3, these present information derived from the accepted theory as discussed above and illustrating the effect of non-condensing gases on condensation processes. From FIG. 1 it can be appreciated that the heat transfer coefficient falls rapidly with increasing air mass fraction in a boundary layer between bulk gas and a film of condensate. FIG. 2 shows that the reduction in the heat transfer coefficient is more severe at lower pressures. FIG. 3 shows that at values of air mass fraction which will be representative of conditions in a steam condenser the proportion of the temperature difference between the bulk steam/air gas and the cooled surface upon which steam is condensing rises rapidly within increasing air mass fraction such that at representative values a large proportion of the temperature difference arises across the boundary layer of relatively high air mass fraction adjacent the condensate film.

Figure 4:
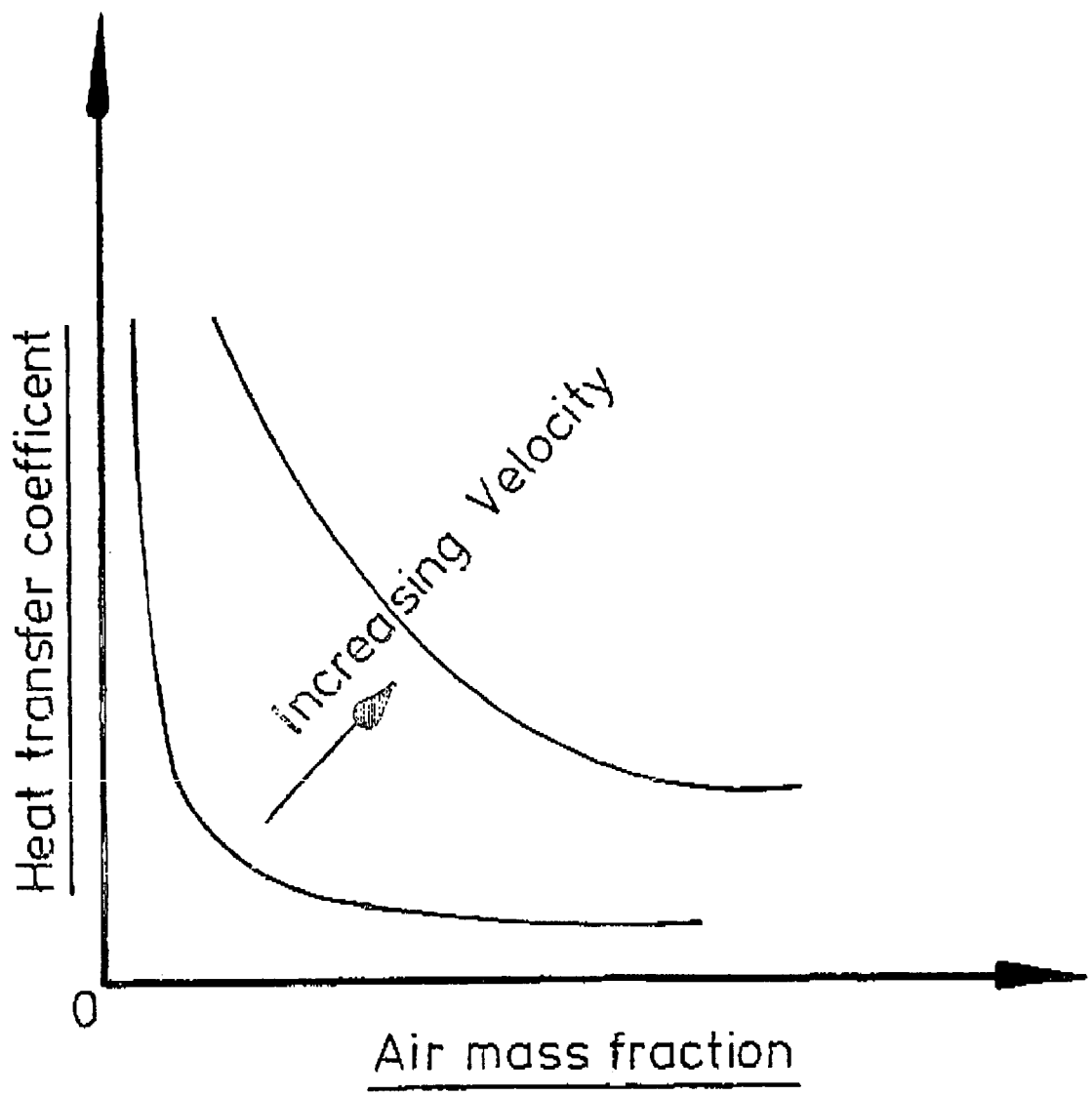
FIG. 4 presents information discussed in the above paper by Robinson, showing the relationship between heat transfer coefficient and air mass fraction for increasing forced convection velocity.

FIG. 4 presents information showing that an imposed gas velocity parallel to the condensing surface improves the heat transfer coefficient. But this is still expected to be significantly affected even at relatively high imposed velocities.

Some embodiments of the present invention makes it possible to reduce the air mass fraction immediately adjacent the cooling surfaces of heat exchangers and as a result to improve the efficiency of such devices. This makes it possible to reduce the size of a condenser for a particular purpose as compared with conventionally designed condensers used for that purpose. Overall efficiency of plant is also increased. The result is potentially of very significant commercial importance.

By way of illustrating the principle behind some embodiments of the present invention, a vertical downward flow of a steam-air mixture passing a horizontal tube in which a coolant flows may be considered. If the coolant at the hot end of the tube is 20° C., to a good approximation this will be the temperature of the water condensed at that location and therefore also the temperature of steam condensing at that location. Thus the partial pressure of the steam at that location will be the saturation pressure given a temperature of 20° C., that is 23 mbars. If the coolant at the cold end of the tube is 10° C., then by the same argument the partial pressure of steam at that location will be 12 mbars. The total pressure at both locations will be the same, the balance being made up by the partial pressure of air at each of the locations.

If it was possible to remove some of the air from around the boundary layer adjacent the cold end of the tube, flow and diffusion processes will also reduce the air mass fraction elsewhere in the condenser including the hot end of the tube. Thus the partial pressure of air will be reduced at both locations, and thus the pressure of the bulk gas around the tube will also be reduced. There is however a further effect, that is the reduction in the air mass fraction at the interface between the bulk gas and the tube will reduce the temperature difference across the boundary layer around the film of water on the tube. As the temperature of the tube is assumed to be substantially constant, the temperature of the bulk gas will be decreased. Therefore the partial pressure of the steam in the bulk gas will also be decreased. This results in a further reduction in the pressure of the bulk gas.

Thus, extracting air from where its concentration is highest, that is adjacent the cold end of the tube, reduces its partial pressure throughout the volume of the condenser. This improves the heat transfer process, resulting in the condensation of more steam and a reduction in the partial pressure of steam throughout the volume.

It will be appreciated that there will be some slight temperature difference across the film of water formed on the tube but this will be relatively insignificant and will not affect the overall situation as discussed above.

If the tube is a tube of a condenser as used in electric power generation, the function of the condenser is to remove the latent heat from steam after it exits a turbine so that the steam is condensed to water. The coolant flowing through the tubes is usually water taken from a separate and dedicated system, whereas the process flow is steam. After expanding from high pressure, steam at an outlet of a turbine is at a sub-atmospheric pressure. As a result the pressure within the condenser volume is lower than the pressure around the condenser and therefore air will leak into the process flow through seals in the turbine and in the body of the condenser. The structure of the condenser is generally large, typically in excess of 6 metres high 15 metres-long and many metres wide. Given the size of such structures and the fact that they are exposed to fluctuating temperatures it is generally not possible to design them in a way that will fully eliminate the leakage of air into the structure when the interior structure is subjected to a partial vacuum. Furthermore, when first installed or after maintenance the structure is in any event full of air at atmospheric pressure. Elimination of air from the structure is therefore not a practical possibility.

Generally condensers of this type define an enclosure housing a nest of tubes through which cooling water flows. The tubes are arranged in parallel so as to form a central open region about which the tubes are distributed. An air extraction duct is in communication with the central open region and air and steam within the central open region is simply pumped out of the condenser enclosure.

Typically, in condensers for a large steam turbine generating electricity of the type described, operational parameters are as follows:

1. the inlet coolant water temperature is 10° C.;
2. the outlet coolant water temperature is 20° C.;
3. the pressure at the outlet of the turbine which communicates with the condenser enclosure is 50 mbar;
4. the temperature of condensate at outlet, which formed on the tubes and then fell to the bottom of the condenser enclosure, is 33° C.;
5. the flow rate of steam is 360 kg/s;
6. the flow rate through the air extraction system is 130 kg/h.

It will be appreciated from the above that the extract flow rate is one part in 10,000 of the steam flow. The temperature of the condensate is, within measurement error, the saturation temperature of steam at 50 mbars. Thus it is not at all obvious that condensate forms at a lower temperature and that it is possible to reduce the vacuum after exit from the turbine. Indeed, the set of parameters outlined above would be taken as indicating an excellent condenser design, as both the vacuum is in line with conventional expectations and the condensate has not been cooled to an unnecessarily low temperature. Although what has been shown and described are operation parameters for one type of condenser, the present invention is not so constrained, and contemplates application to any type of condenser.

It will be appreciated that in the described structure water droplets are cooled to a temperature of between 10° C. and 20° C. and then heated up to 33° C. as they fall through the bulk gas within the condenser body. Air is pulled through the nest of tubes, degrading the heat transfer of every tube, with the degradation increasing towards the open central region of the nest of tubes. If it was the case that all of the extracted flow was air this would imply that the value of the air mass fraction within the condenser is one part if 10,000, but given the understanding of the physics as represented in FIGS. 1 to 4, it will be appreciated that the value of the air mass fraction at the inner surface of the boundary layers formed around the tubes will be very much higher than one part in 10,000. Furthermore, the air mass fraction within the central region of the nest of tubes will also be higher than one part in 10,000. Typically the flow rate of steam that is not condensed and therefore is extracted with the residual air is about the same as that of the extracted air, and so the air mass fraction of the extracted flow will be around 0.5. Where there are water droplets at temperatures between 10° C. and 20° C., the air mass fraction may be higher than that at the extract from the central region. Some air will remain in cold regions of the condenser that are not swept by the flow and thus the partial pressure of the air in such regions will not be particularly low and is a potential source of instability as operating conditions change.

Given that a significant proportion of the extracted gas is steam, there is a continuous loss of process gas and therefore of potential condensate. In this type of industrial process this causes a requirement for a make-up flow, which in other types of process would result in a loss of potential product. Furthermore, energy is being supplied to extract this flow of potential condensate which represents a waste of energy. Energy loss can also arise as a result of heating of the extract pipe where it traverses through the bulk gas in the central region of the nest of tubes.

Although the presence of a non-condensing gas degrades the rate of condensation of a gas condensing out of a mix of gases, there is little understanding of the sensitivity of the process to even small traces of non-condensing gases. Although it has been appreciated that imposing a flow across condensing surfaces reduces the effects of non-condensing gases the underlying significance of the presence of traces of non-condensing gases has not been appreciated. Problems have arisen in the past as a result of the presence of non-condensing gas in condensers. For example, in the 1960's and 1970's a number of steam turbine condensers were installed in the United Kingdom. These did not perform as well has had been expected and as a result an extensive research programme was initiated. It was found that regions of the tube nest within the condensers were being blanketed by air, which locally reduce the flow of steam. Modifications were made to the tube nests, and as a result the plants performed more or less as expected. Accordingly it was believed that the degradation of performance by the entrained air had been understood and solved. This was not the case.

Figure 5:
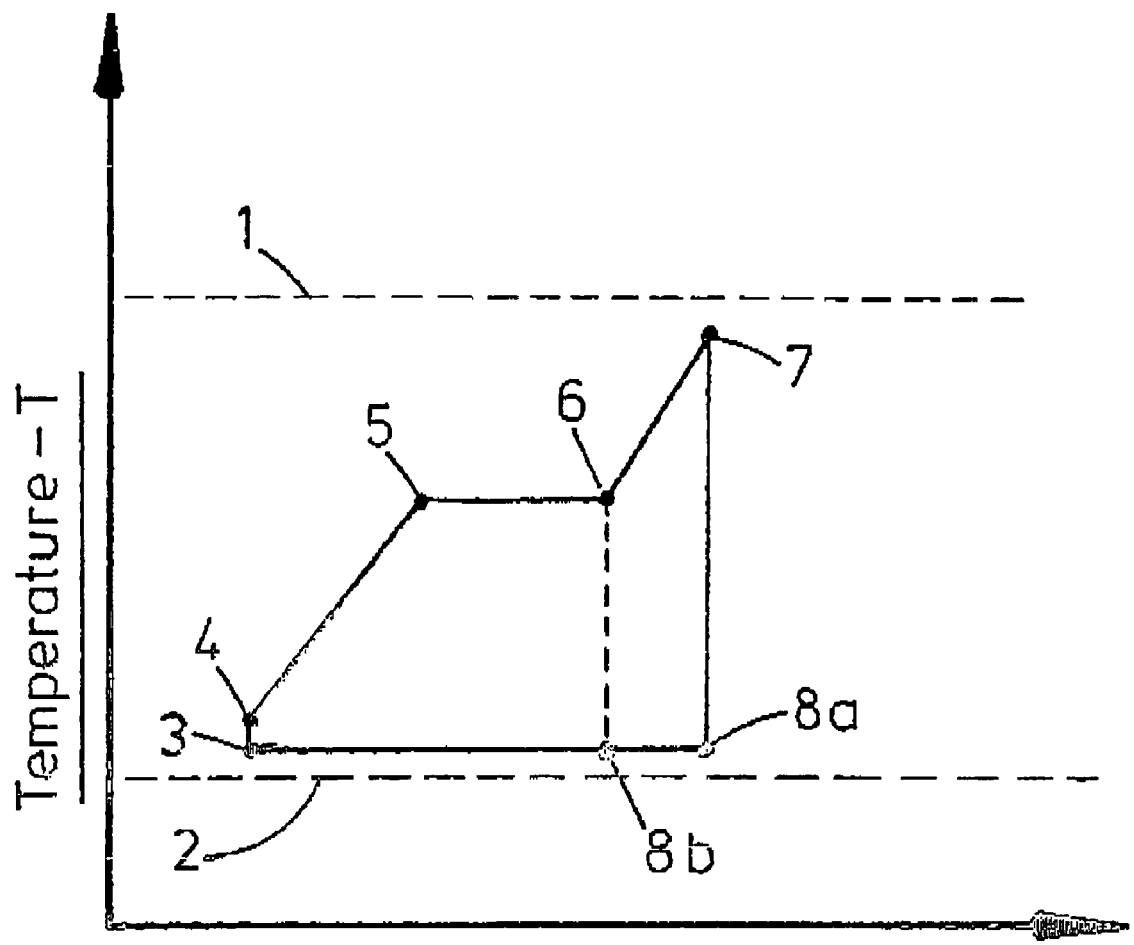
FIG. 5 is a schematic representation of the relationship between temperature and entropy describing the closed thermal cycle of a steam power station with a turbine generator.

Referring to FIG. 5, this represents the well-known thermal cycle of a steam power station with turbine generator. The temperature of the heat source of the system is represented by a broken line 1 and the temperature of a heat sink, for example a source of cold water, is represented by broken line 2. The temperature rise represented by the line between points 3 and 4 corresponds to an increase in pressure between a condenser output and the input to the water heating system. The line between points 4 and 5 corresponding to heating of the water. The line between points 5 and 6 corresponding to the formation of steam at a stable temperature corresponding to the boiling point of water. The line between points 6 and 7 corresponding to super-heating of the previously formed steam. The line between points 7 and 8a corresponds to the extraction of energy from the super-heated steam by the driven turbine. (The line between points 6 and 8b corresponds to the alternative of extraction of energy from saturated steam).

The line between points 8a and 3 (or 8b and 3) corresponds to the residual heat rejected to the heat sink. The spacing between the line from points 8a or 8b to 3 and broken line 2 corresponds to the difference between the temperature of the gas in the condenser and the temperature of the coolant. The smaller this difference can be made, the greater will be the efficiency of the generating system as the steam delivered to the turbine will expand to a lower pressure, thereby generating more electricity and increasing the efficiency of the cycle. The present invention enables this temperature difference to be reduced.

Figure 6:
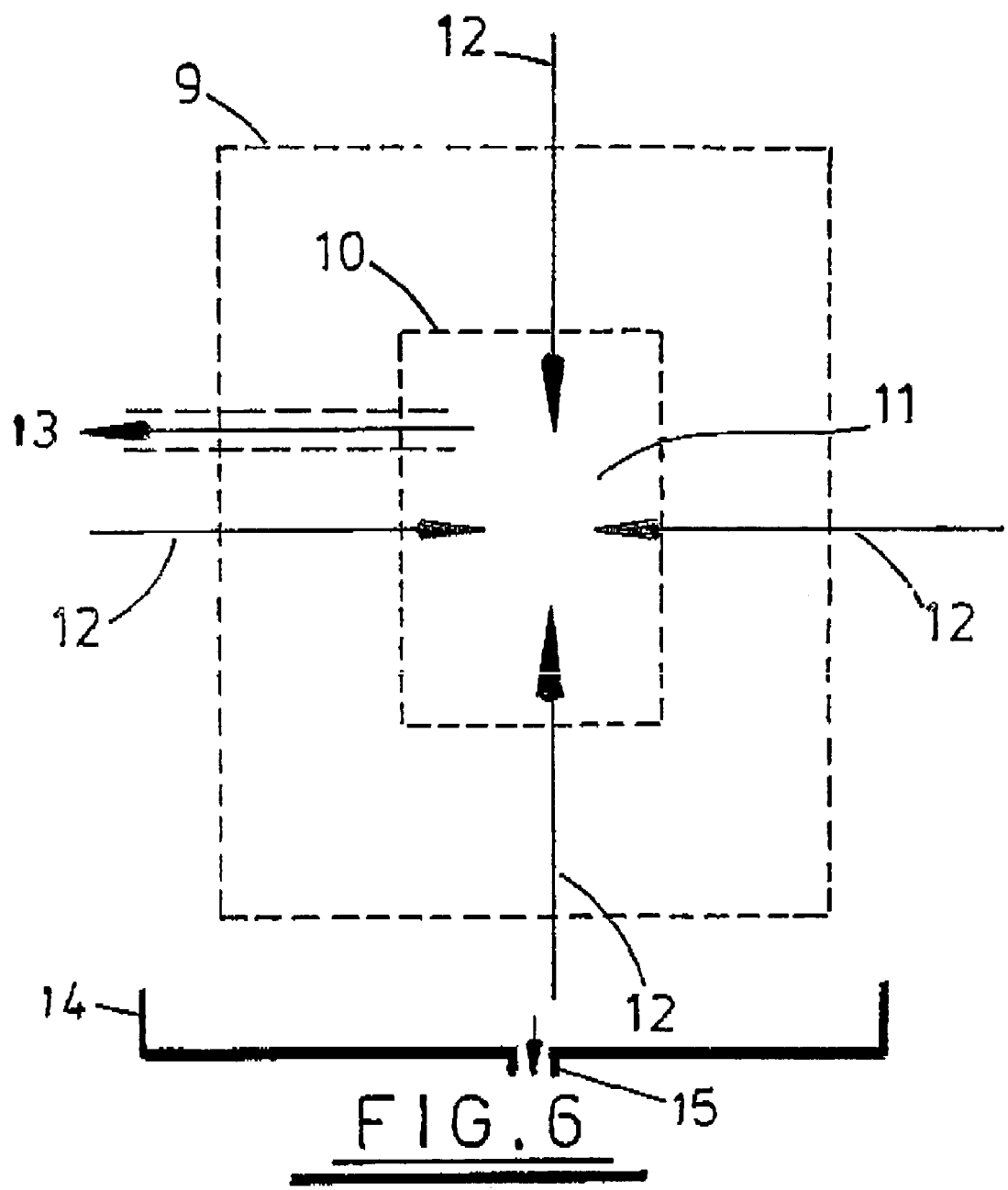
FIG. 6 represents a vertical section through a known steam turbine condenser.
Figure 7:
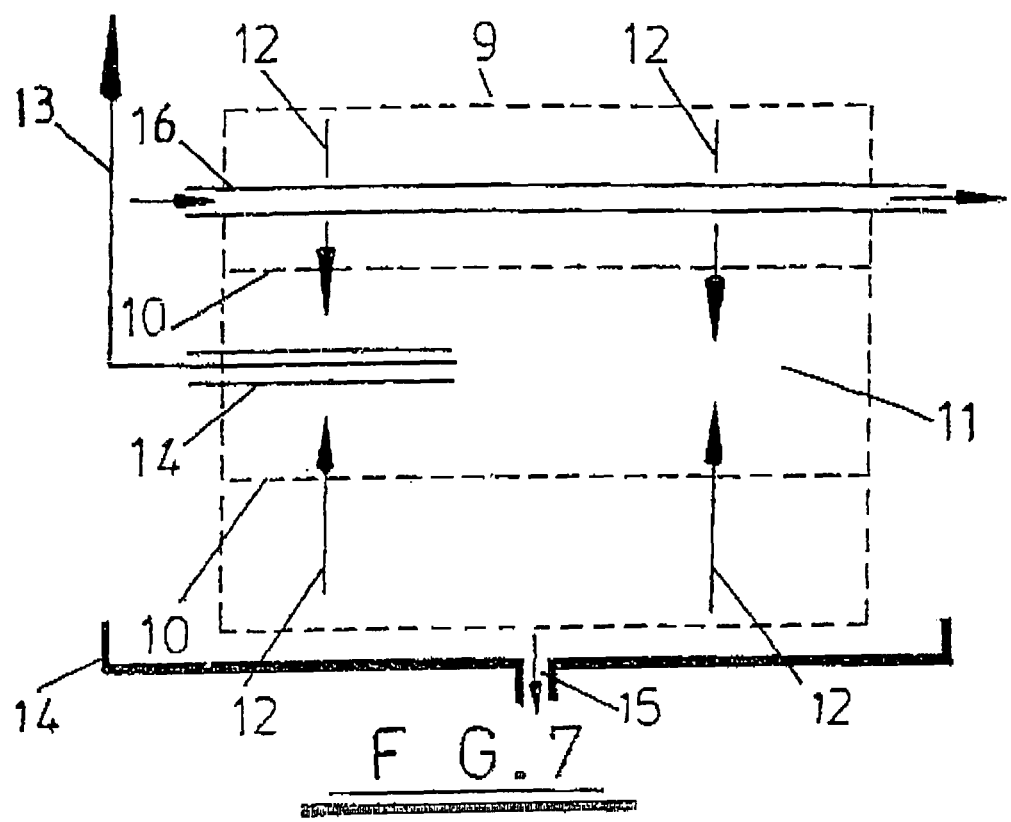
FIG. 7 represents the same structure as FIG. 6 but taken through a vertical section perpendicular to that of FIG. 6.

Referring now to FIGS. 6 and 7, the structure of a known steam condenser is illustrated in general terms. Generally such condensers comprise a nest of horizontally extending tubes which carry cooling water, steam to be condensed being arranged to flow inwards from the exterior of the nest to an open region at the centre. In FIGS. 6 and 7, broken lines 9 represents the outer periphery of the nest of tubes, and broken lines 10 the inner limit of the nest of tubes. The central open region is represented by the area 11. Steam flowing radially inwards is represented by arrows 12. Flow 13 in FIGS. 6 and 7 represent the off-take for air and the residue of steam that has not condensed. A condensate collection system 14 collects falling water droplets, the flow of condensate being extracted via outlet 15. One of the nested tubes is represented by component 16 in FIG. 7.

As discussed above, it is generally assumed that, because the air mass fraction at the bulk gas inlet (the outside of the tube nest) is so low, and there appears to be little air blanketing, the air in the structure has little effect. However this is not the case. Locating the air extract system on the downstream side of the tube nest and in the open region in the centre results in a large air-rich volume within the condenser. Furthermore the inward flow of air, of progressively increasing air mass fraction, "poisons" the condensation heat transfer processes on every tube of the condenser.

FIG. 7 indicates that the pipe work for the extract flow 13 for the known steam condenser has to pass through the bulk gas. The gas flowing through this pipe work contains a significant proportion of gas that could potentially be condensed. Thus the pipe work, pump and fittings have to be sized appropriately. This is expensive. The pump consumes energy. There is a need to make up for the loss of potential condensate (and in other processes there will be a loss of potential product). These costs can be minimised by thermally isolating or insulating this extract system from the effects of the bulk gas to prevent condensate from being re-evaporated and the extracted gas being re-heated. Both effects will increase the volume flow rate of gas, which increases the backpressure, thus offsetting some potential benefits of the design.

Droplets of water falling off the condenser tubes are at approximately the same temperature as the surface of the tubes. Therefore, adjacent to where these droplets are formed, the air mass fraction is high. As the droplets fall through the local steam/air mixture they are heated up to the temperature of that mixture, and the air mass fraction reduces. Accordingly, if gas is removed from the structure at locations where the gas mixture is still relatively cool, the proportion of air in the removed gas is relatively high.

Figure 8:
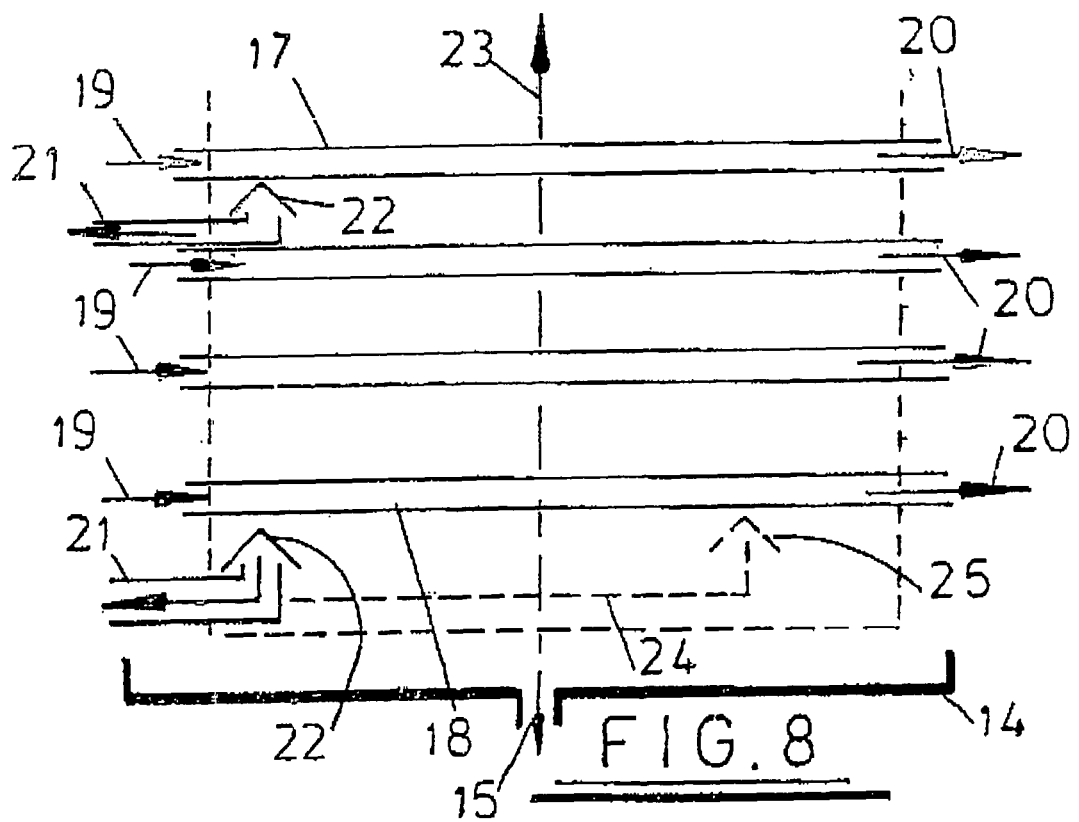
FIG. 8 represents the position of air extract devices according to one embodiment of the present invention in a structure such as that illustrated in FIGS. 6 and 7.

Referring to FIG. 8, this represents the disposition of an array of the tubes in the tube nest in the bottom portion of the structure shown in FIG. 7 according to one embodiment of the present invention. Tube 17 represents the position of a tube adjacent the open interior of the structure, whereas tube 18 represents the lowermost tube in the structure. Cold coolant is introduced to the left hand end of these tubes (in the example above at a temperature of 10° C.) as indicated by arrows 19, and the heated coolant (in the example above water at a temperature of 20° C.) issues from these tubes as represented by arrows 20. Immediately adjacent the inlet end of the tubes 17 and 18 air extract ducts 21 are provided, the inlet ends of these ducts being located beneath droplet deflectors 22 arranged to prevent any droplets of water entering the air extract ducts 21. The uppermost duct 21 is placed adjacent the interior of the tube nest. (The flow of steam is perpendicular to the axis of the tube as represented by arrow 23). The lowermost duct 21 is located at the bottom of the structure given that there is a tendency for gas incorporating a large volume of air to fall to the bottom of the structure. Thus, by the simple expedient of fittings ducts 21 as shown in FIG. 8 the proportion of the air adjacent the tubes of the condenser can be significantly reduced.

One effect from the limited number of air extract ducts as shown in FIG. 8 is achieved by locating them adjacent the "cold" end of the tubes of the condenser. Some benefit may, however, be achieved by providing ducts extracting air from points distributed along the length of the tubes as represented by broken lines 24 and 25.

FIG. 8 represents a single vertical section through the tube structure and accordingly it will be appreciated that ducts 21 will be distributed in a direction perpendicular to the plane of FIG. 8.

It will be appreciated that any convenient structure could be provided to prevent condensate being extracted through the air extract duct 21. The simple "roof" structure shown in FIG. 8 could be substituted for example by a pipe with orifices in the bottom as shown in FIGS. 9A and 9B, FIG. 9B being a section on line 9B to 9B of FIG. 9A, or by a member of inverted U-shaped section as shown in FIGS. 9C and 9D, FIG. 9D being a section on line 9D-9D of FIG. 9C or by a rectangular channel with a slot cut in its base or the like. As illustrated in FIG. 9E, an array of interconnected extract pipes 21 could extend perpendicular to the tubes 18.

Figure 10A:
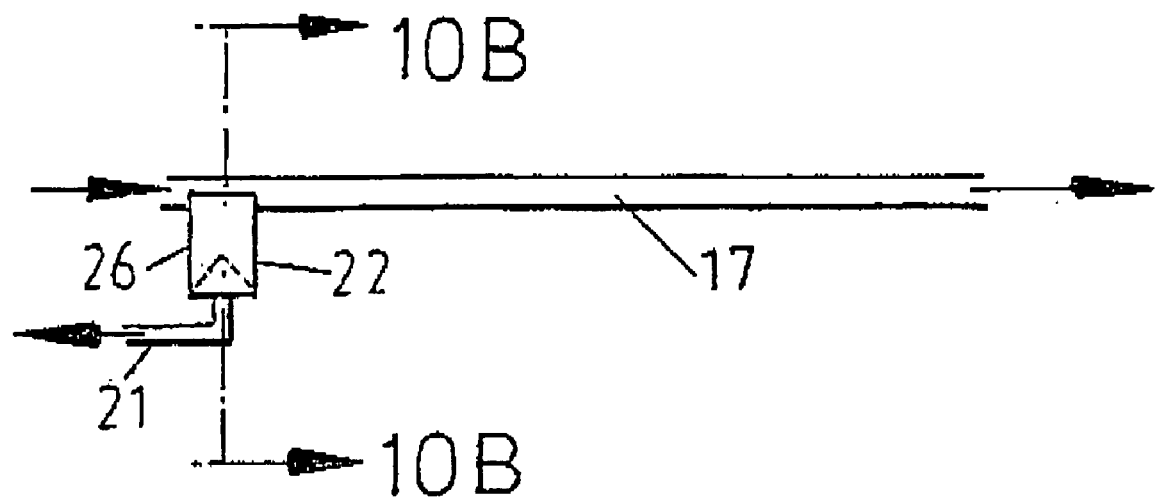
FIGS. 10A and 10B represent a shielded air extract gas intake according to yet another embodiment of the present invention which may be used as an alternative to that shown in FIG. 8.
Figure 10B:
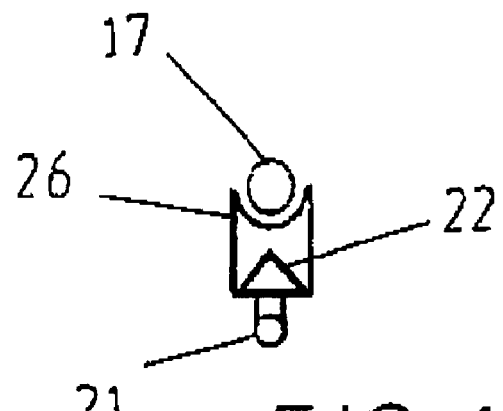

A shield could be provided to protect the falling droplets of cold condensate and surrounding cold gas from the temperature and velocity of the hotter flow of the bulk gas, which would reduce the mass fraction of non-condensing gas. FIGS. 10A and 10B represent such a shield, the side elevation of FIG. 10A showing the axial length of the shield 26 is short to protect the gas extract. The shield 26 is generally cylindrical, with its lower edge surrounding the deflector 22 and its upper edge extending to adjacent the tube 17. The end elevation of FIG. 10B shows the clearance around the coolant tube and deflector is small.

Thus, air is extracted from the coldest points within the structure. The appropriate positions of air extract ducts can be determined by measurement of the temperatures of the structure before modification. It will of course be appreciated that falling droplets of condensate create a localised volume of high air mass fraction which makes an arrangement such as that illustrated in FIG. 8 particularly appropriate. The air extract ducts reduce the concentration and partial pressure of air in the localised volumes of highest concentration, and then diffusion processes reduce the concentration of air throughout the structure. Hence, even if air is extracted from only a limited number of regions of the structure, the heat transfer processes of the condenser will be improved throughout the structure.

Referring to the structure of a known condenser in which the air is extracted from the centre of the tube nest, care should be taken in some embodiments to ensure that the extract flow of gas is taken from the coldest part of the volume. Measures such as the use of a suitable dip tube (perhaps thermally insulated) hung from the structure above would minimise the transfer of heat into this volume and so maximise the air mass fraction in the extract flow and minimise process flow losses. In particular the contents of the extract ducting should be thermally insulated from the inlet steam/air mixture from the turbine.

Figure 11:
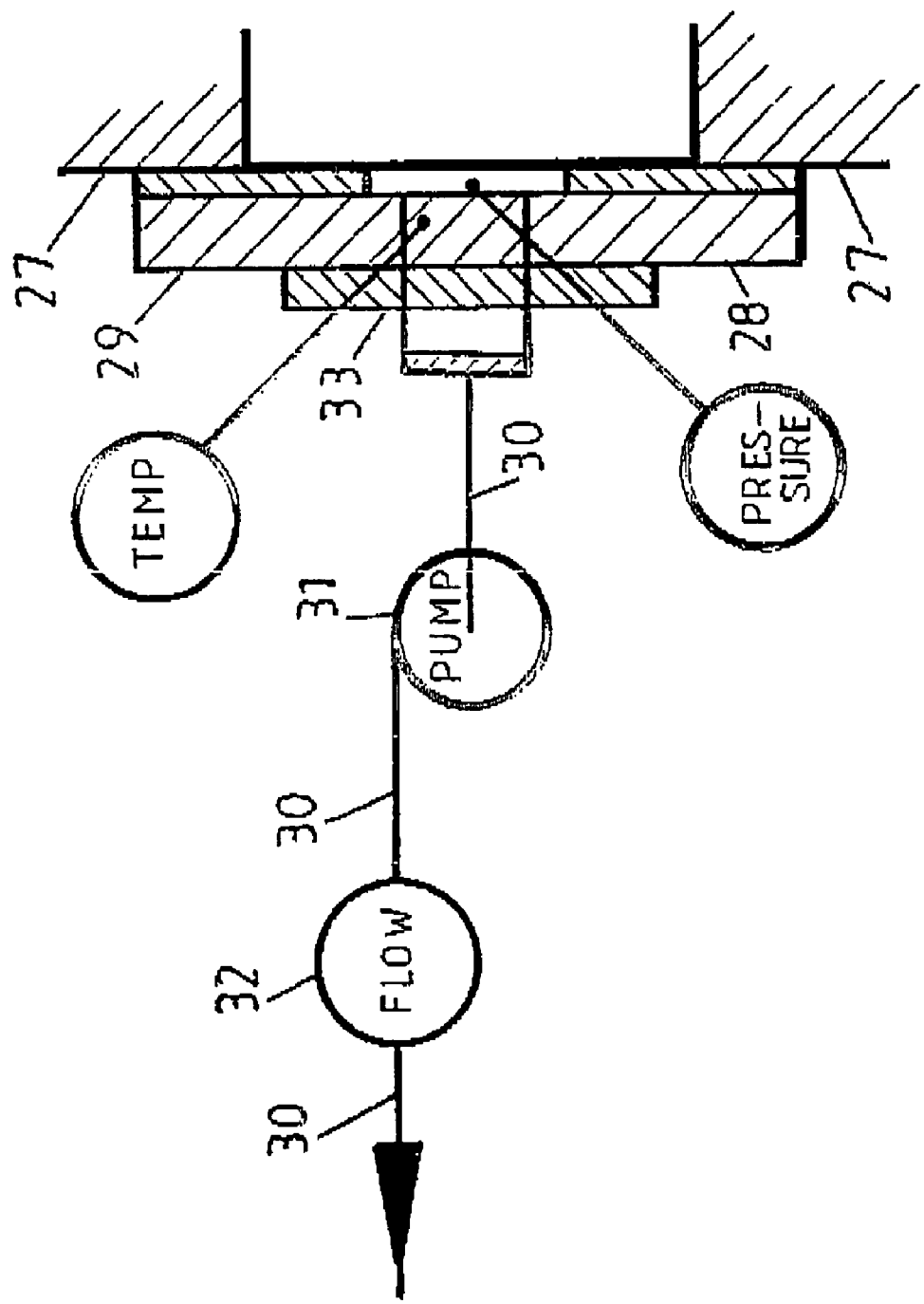
FIG. 11 schematically illustrates the removal of non-condensing gases according to yet another embodiment of the present invention by relying upon localised cooling of the gases.

An auxiliary cooling system, or sub-condenser, could be installed to create localised volumes of very high air mass fraction, and additional air extract points located appropriately. For example, in generating plant where cooling towers form the main heat sink, make-up water could be colder than water from the cooling towers and would provide an appropriate heat sink. Alternatively a dedicated supply could be installed. An effective approach would be to install a plant to freeze out the remaining potential condensate. One approach would be to utilise covers used during construction or for inspection. FIG. 11 illustrates a modified cover provided for this purpose.

Referring to FIG. 11, the condensate pressure vessel has a wall 27 defining an aperture covered by a plate 28 insulated from the wall 27 by a thermally insulating gasket 29. The plate 28 defines many small diameter passages (only two of which are shown) communicating with a manifold connected by a suitable pipe 30 to a pump 31 and a flow meter 32. Cooling and heating coils (not shown) are incorporated in a body 33 in good thermal contact with the plate 28. A pressure sensor and a temperature sensor sense the pressure adjacent the plate 28 and the temperature of the plate 28.

In use, the cooling and heating coils would be controlled to maintain the temperature of the centre of the plate 28 at just above the freezing point of water given the sensed pressure, thereby maximising the air fraction in the condenser adjacent the plate 28 and therefore maximising the air fraction in the extracted flow. If the flow-meter was to detect zero flow and the sensed temperature indicates there could be frozen water in the extract system, the control system would reduce the cooling air or halt cooling and turn on the heating coils.

In the arrangement illustrated in FIG. 11, a localised "cool spot" is produced by cooling a modified cover plate adjacent which a relatively high concentration of air accumulates. Alternative approaches may be adopted to produce a localised cool spot. For example, in a condenser in which a condensate pool forms all or part of the condensate pool could itself be cooled so as to encourage concentration of air adjacent the pool. Gas would then be extracted from adjacent the condensate pool.

Although in the above example embodiments of the present invention has been described with reference to a particular design of condenser for steam generating plant, it will be appreciated that the invention can also be applied to other designs of steam generating plant condensers and to other industries. For example, the performance of chemical and oil refinery processes could be improved by localised concentration of a gas to be extracted. Steam sterilisation plant for medical use and for use in the food industry could also be made more efficient, resulting in reduced cycle time to establish an initial vacuum and more reliable control of temperatures during a sterilisation process.

The embodiments of the invention described above are immediately applicable in existing condensers which are in use in steam generating plant. It is envisaged that very substantial increases in efficiency by retrofitting the invention to existing plant can be achieved. The invention can be incorporated in new plant however and it is envisaged that in for example condensers for steam generating equipment the application of the invention will enable a dramatic reduction in the size of condenser for a particular application. For example it is envisaged that condenser sizes may be reduced by a factor of as much as five. It will be appreciated that this will represent a radical departure from existing design assumptions.

For example, again using the condenser of a turbine of steam generating plant as an example, instead of having a nest of tubes with gas flows inwards towards the centre, with air being extracted from the centre, a design could be envisaged which would have a straight-through flow. The term straight-through flow is used to indicate a condenser in which steam with entrained air enters the condenser through an upper end of condenser housing, air being extracted from suitable locations which correspond to localised cool spots resulting from for example falling droplets of condensate or at the bottom of the structure just above a condensate pool. In the latter case, the area of the condensate pool should be as large as possible. The condensate pool could incorporate its own heat exchanger, perhaps cooled by a flow of coolant at the coolant inlet temperature of the condenser. This would offset any potential for incoming steam to evaporate condensate. The residual of the vertical downwards flow of steam would impinge on the condensate in the condensate pool and some of the residual steam would condense. A further advantage of such a condenser geometry is that the bulk flow of gas is always in the same (vertical) direction, emitting energy losses due to changes in the direction of flow within the condenser. The pressure at the outlet from the turbine could thereby be further reduced.

Figure 12:
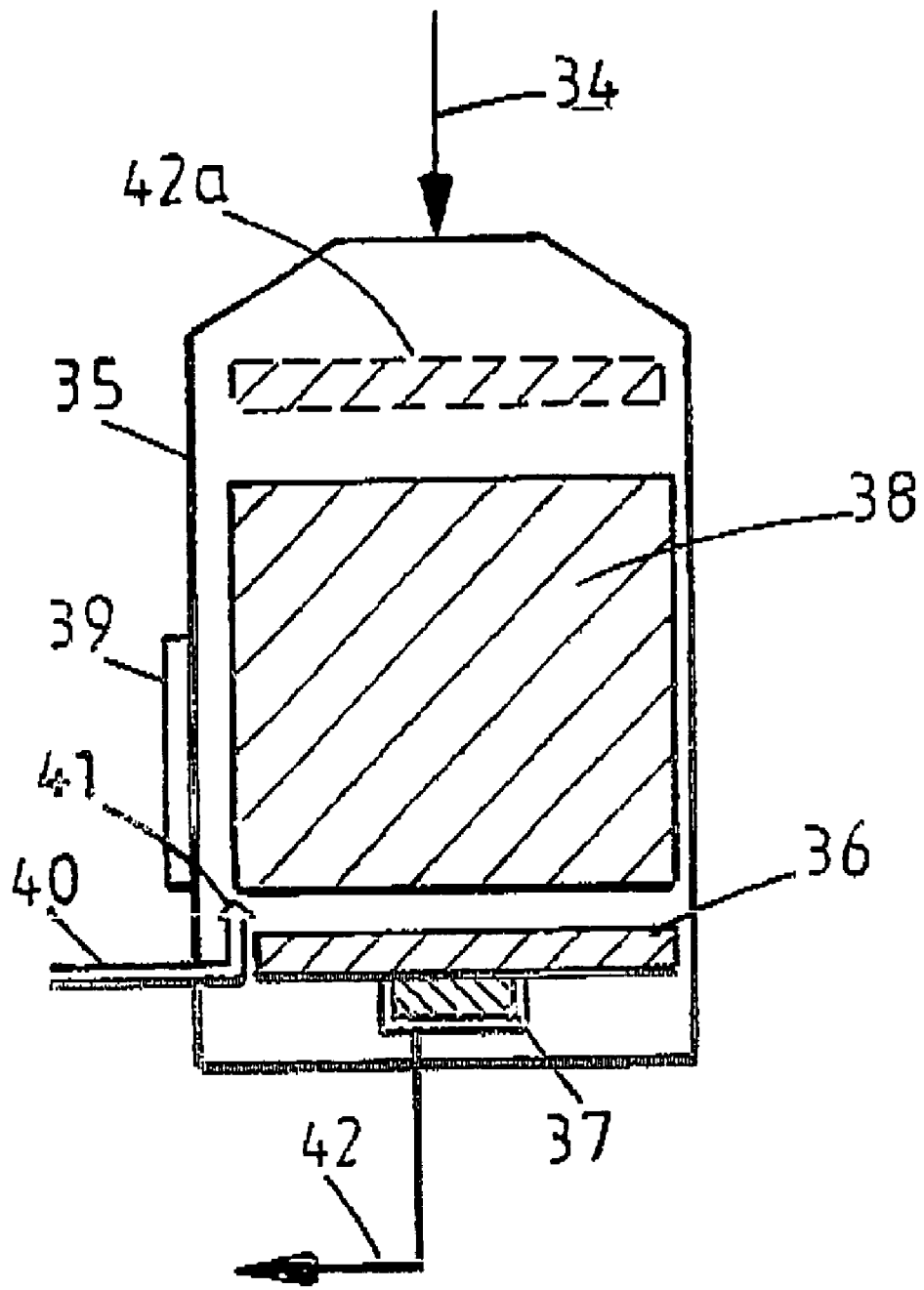
FIG. 12 schematically represents the overall structure of a modified steam condensing plant according to another embodiment of the present invention.

The principles of a straight-through condenser referred to above could be embodied in a condenser design such as that illustrated in FIG. 12. In FIG. 12, an incoming air and steam flow is represented by arrow 34. The incoming flow passes through a condenser having an outer body 35 and condensate is collected in a condensate pool 36. The condensate pool 36 has a large free surface area. A heat exchanger 37 is in contact with the condensate pool 36 so as to cool condensate within the pool. The result is a concentration of air immediately above the free surface of the condensate in the pool. A nest of horizontal tubes represented by area 38 is located above the condensate pool, condensing out water dripping from those tubes into the condensate pool 36. An auxiliary cooling device 39 may also be provided to produce a further cool spot in a manner analogous to that described with reference to FIG. 11. The auxiliary cooling device 39 could be for example mounted on a removable plate. An outlet (not shown) for non-condensing gas could be provided in association with the auxiliary cooling device 39. A non-condensing gas outlet 40 is provided, the outlet extending from beneath a droplet deflector 41 similar to the deflector 22 of FIG. 10. The outlet 40 is located just above the surface of the condensate pool 36 so as to remove the gas of high air content which accumulated immediately above the condensate.

Condensate will be removed from the condensate pool 36 as indicated by flow 42. That flow may be passed through an auxiliary heat exchanger 42a located at the top of the condenser so as to reheat the condensate by absorbing energy from the incoming flow of steam and air if condensate reheat is required in a particular application.

A conventional condenser design in which the bulk gas flows inwards has the advantage that the cross-sectional area of the flow reduces from the inlet to the outlet, thereby partially offsetting the reducing gas velocity which results from the reducing mass flow as gas is condensed out of the mixture. This reduction in cross-sectional flow area to an extent mitigates the adverse effects on the condensation process of the increasing mass fraction of the non-condensing gas. A straight-through design such as that illustrated in FIG. 12 does not provide the advantages of an inwards flow but nevertheless careful location of the various extraction devices through which non-condensing gases are removed from the condenser still delivers a considerable overall benefit.

It will be appreciated that the design of a turbine/condenser combination will be selected with a view to optimising performance given the conditions that apply in the particular application, for example in dependence upon the source of cooling water from the sea, a river or a lake, the use of wet or dry cooling towers as the final heat sink etc. The designer will have to make a choice between the minimum cost of condenser (by minimising the size and the area of the heat transfer surface) or accepting a larger condenser to enable the use of cheaper components or design of heat sink to reduce the overall capital cost. The final choice will depend therefore on the site and the economic requirements, for example whether or not the lowest possible capital cost or the lowest possible long term running cost is required.

Figure 13:
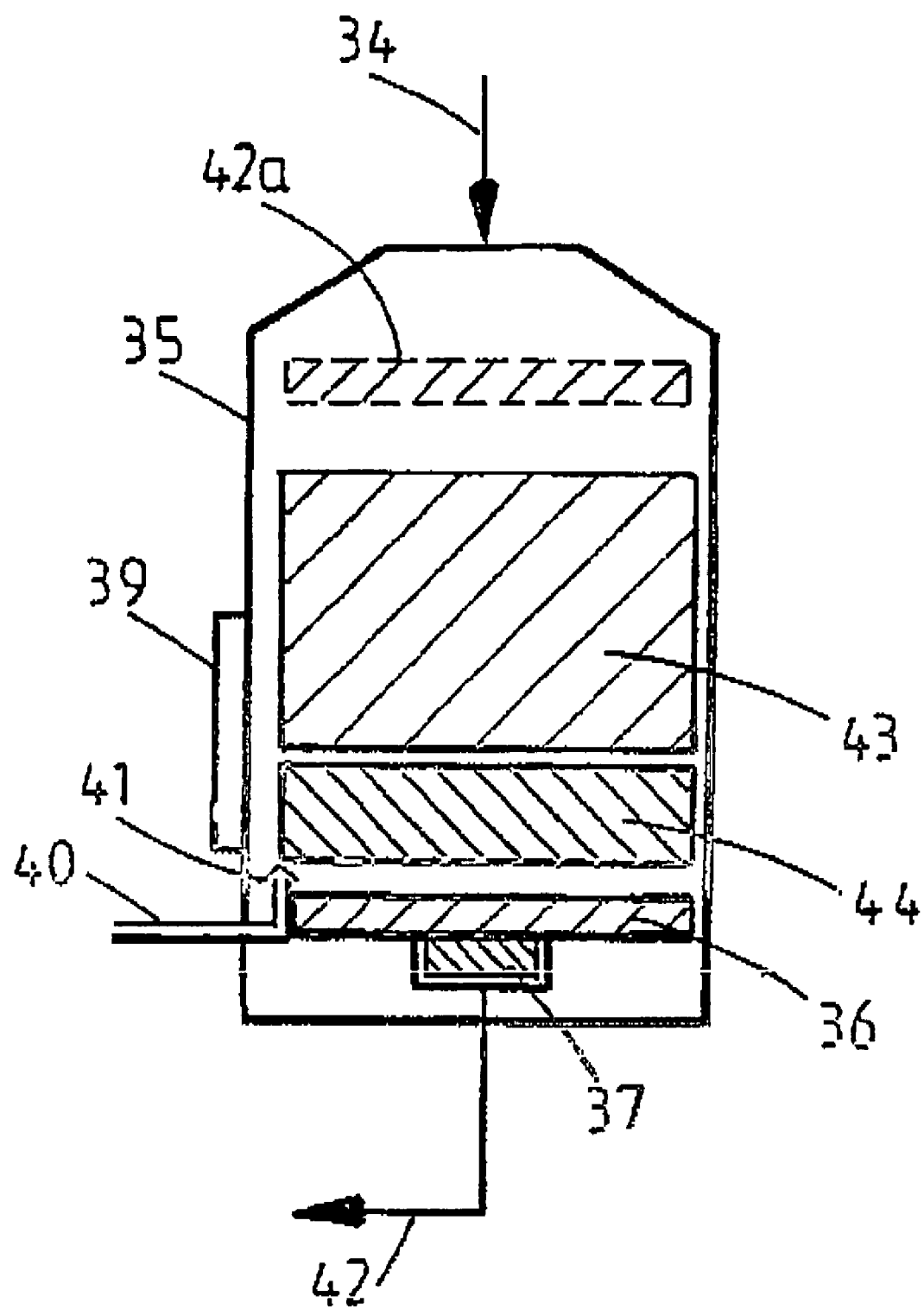
FIG. 13 represents an alternative arrangement to that shown in FIG. 12.

FIG. 13 shows a refinement of the design outlined in FIG. 12 in which the main tube nest which is shown as a unitary assembly 38 in FIG. 12 is split into a pair of in-line sections 43, 44. It will be appreciated of course that more than two in-line sections could be used in an assembly of the general type illustrated in FIG. 13. Where appropriate the same reference numerals are used in FIG. 13 as in FIG. 12.

The tube nest sections 43 and 44 of FIG. 13 could define separate primary and secondary heat exchangers with separate heat sinks, the secondary heat exchanger 44 being supplied with coolant at a temperature which is lower than the temperature of coolant supply to the primary heat exchanger 43. Condensate dripping off the relatively cold secondary heat exchanger 44 will be colder than condensate falling off the primary heat exchanger 43, enhancing the concentration of cold gas of high air content in the region from which gas is withdrawn from the condenser body 35. The lower secondary heat exchanger 44 will reject residual heat and could be designed so that only a small proportion of the total steam condensed would be condensed within the tube nest 44. In this way the dual functions of the conventional heat sink of rejecting the total heat to the environment, and providing the lowest possible temperature (and therefore exhaust pressure) can be separated. This increases the options for the choice of heat sink (source of cold water for example) or type of cooling tower (wet or dry) or makes a combination of different heat sinks and cooling towers a possibility.

Figure 14:
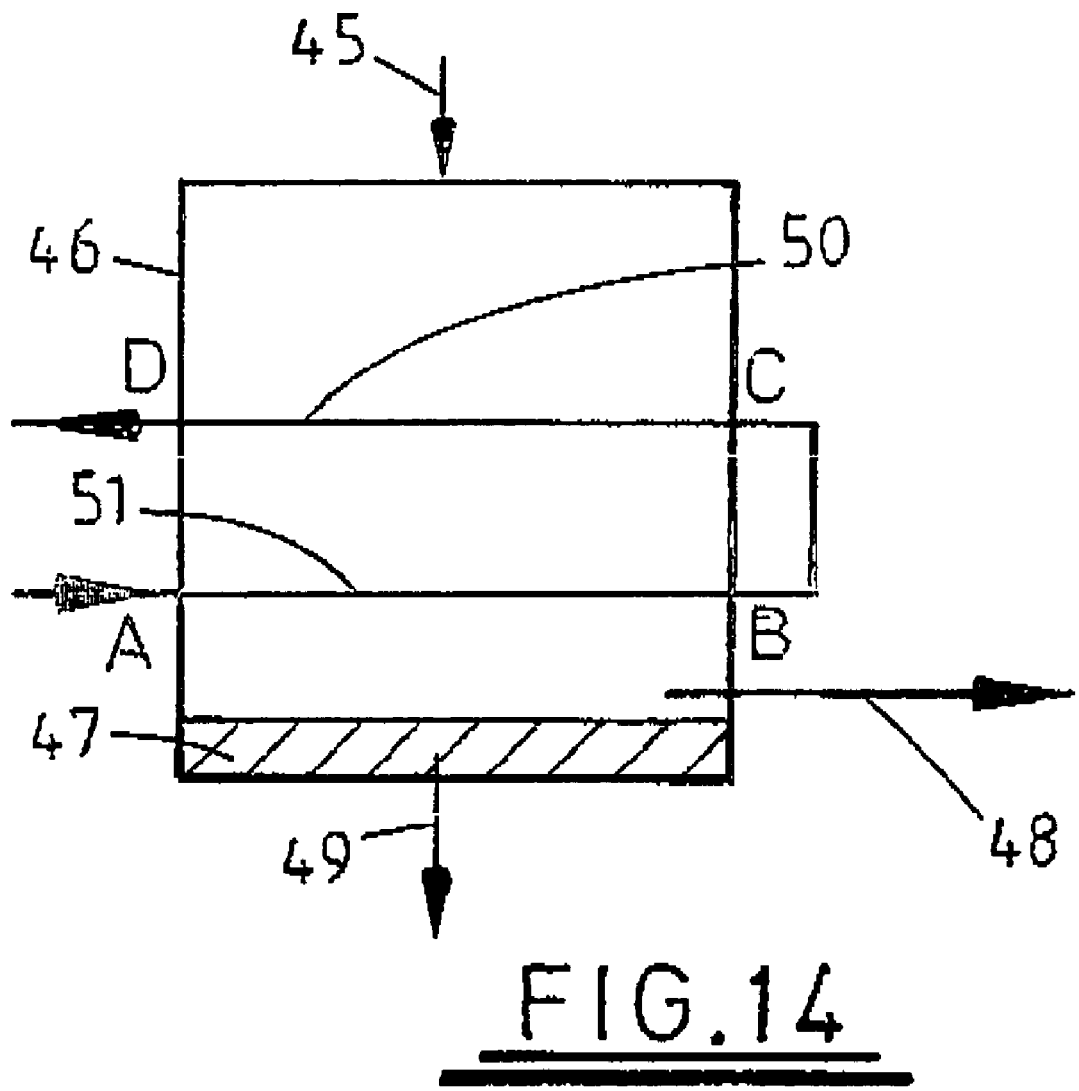
FIG. 14 schematically represents a further embodiment of the present invention having an arrangement for achieving a double pass of coolant through a condenser.

Given a straight-through condenser structure as illustrated in FIGS. 12 and 13, and assuming that the or each tube nest incorporates horizontal condensing tubes, various approaches are possible to maximise the duty of all the tubes. FIG. 14 schematically illustrates a simple arrangement in which the flow of cooling water can make more than one pass through the condenser. Such an arrangement can reduce the temperature difference between the gas mixture at entry and the first tubes encountered by the mixture towards the top of the condenser whilst maintaining an adequate temperature differential between the gas mixture flow and the tubes which are lower down in the tube nest. In FIG. 14, the incoming steam and air mixture is represented by arrow 45, the condenser housing is represented by the rectangle 46, and the condensate pool is represented by the shaded area 47. Air is extracted as represented by arrow 48 from immediately above the condensate pool and condensate is removed as indicated by arrow 49. The tube nest incorporates an upper tube 50 and a lower tube 51 which are connected in series such that coolant enters tube 51 at point A, flows from tube 51 to tube 50 via points B and C, and exits the condenser at point D. Thus the coolant within tube 51 will be colder than the coolant within tube 50. Given that the steam/air mixture cools as it moves vertically downwards this arrangement ensures that the cooling steam/air mixture encounters progressively cooler tubes as it moves vertically downwards.

In the arrangement of FIG. 14, it will be appreciated that the portion of tube 51 adjacent point A can be made to work as efficiently as the end of tube 50 adjacent point D. There will however be no significant temperature difference between the end adjacent point B of tube 51 and the end adjacent point C of tube 50.

Figure 15:
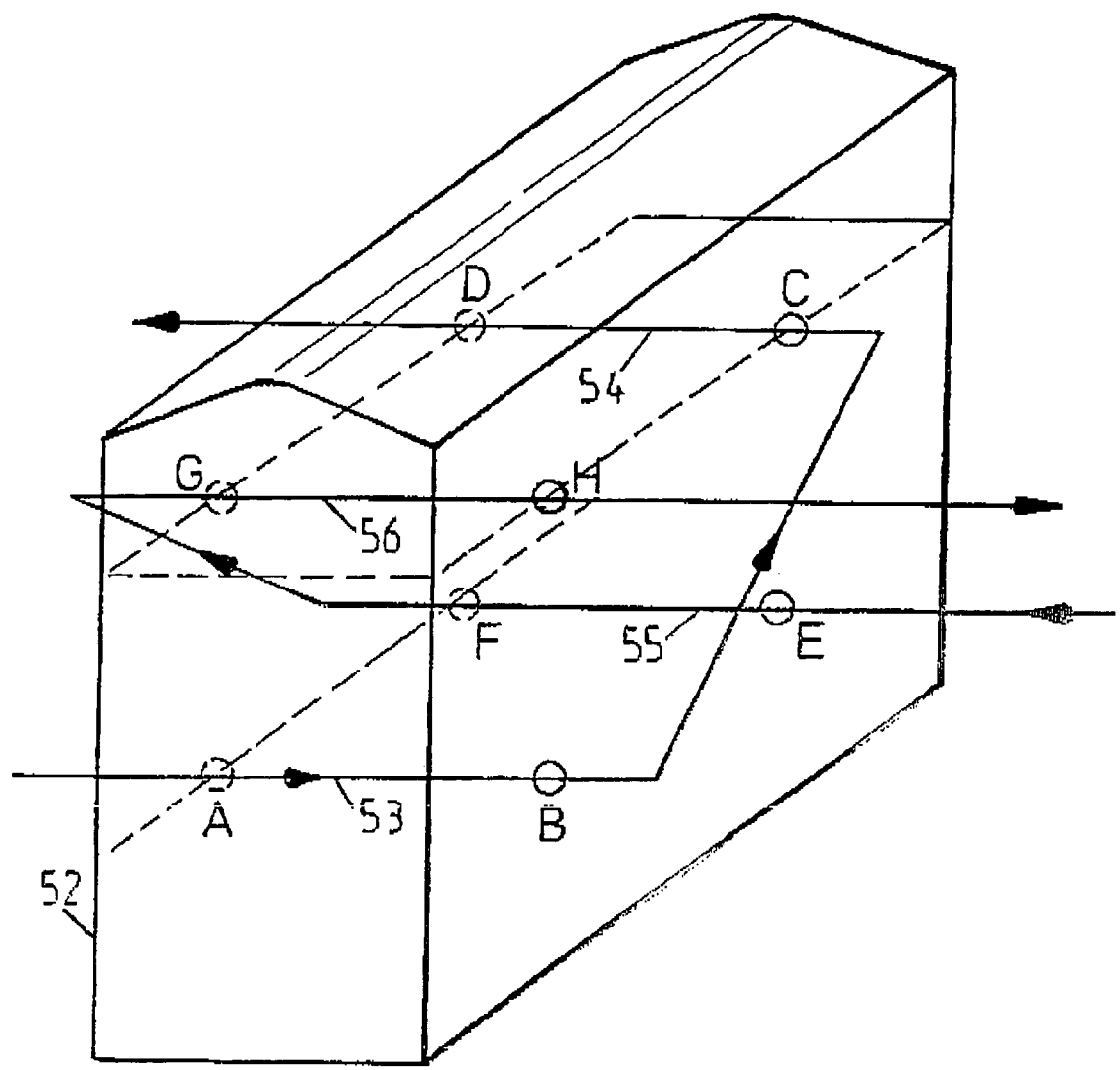
FIG. 15 schematically represents a further embodiment of the present invention having an alternative double pass design to that illustrated in FIG. 14.

FIG. 15 illustrates an alternative flow pattern in which a coolant enters a condenser 52 at point A to pass through a tube 53 and exit the condenser at point B. That flow is then transferred to point C, flows through tube 54 and exits the condenser at point D. A second flow enters the condenser at point E and traverses the condenser in tube 55, exits the condenser at point F, re-enters the condenser at point G and traverses the condenser through tube 56, leaving the condenser at point H. Thus in contrast to the arrangement of FIG. 15 where the series-connected pair of tubes 50 and 51 are parallel and located one above the other, in the arrangement of FIG. 15 first and second series connected tube pairs 53, 54 and 55, 56 are spaced apart in both the vertical and horizontal directions. The first flow enters from one side of the condenser (the side of points A, D, F and G) whereas the other flow enters from the other side of the condenser (the side of points B, C, E and H). As a result, coolant flows in one direction in the first tube 53 of the first pair and the second tube 56 of the second pair, but in the opposite direction in the second tube 54 of the first pair and the first tube 55 of the second pair. The tubes 53 and 56 are spaced apart in the process flow direction, as are the tubes 54 and 55. Thus each tube can be designed to remove a similar quantity of heat as vertically spaced points on tube pairs 53, 56 and 54, 55 are always at different temperatures. For example it may be that the temperature of the coolant at point A will be 10°, at points B and C 15° C., and at point D 20° C. Similarly, the temperature at point E may be 10° C., the temperature at points F and G may be 15° C., with the point H at the final exit temperature of 20° C.

It will be appreciated that in the arrangements illustrated in FIGS. 14 and 15 extract devices such as those shown in FIGS. 12 and 13 will be provided to remove non-condensing gas from cold spots within the structure.

In the embodiments of the invention described above, condenser tube nests are generally described as being made up from a series of parallel horizontal tubes. Alternative tube arrangements are possible. For example, the cooling tubes could be vertical and adopting such a design would provide an alternative method for maintaining a good temperature difference between the gas mixture and the tubes throughout the tube nest. For example, bulk gas could be passed through the condenser in a vertically condensing gas flow and coolant could be passed through the condenser in vertical tubes with the coolant flowing vertically upwards through the tubes. This would improve condensation heat transfer as compared with conventional designs, and therefore the surface area of the tubes making up the nest could be smaller than in current designs.

In systems with horizontal tubes, the coolant temperature varies in direction which is transverse to the vertical component of the flow of bulk gas and thus alters the heat transfer characteristics across the width of the structure. With vertical tubes and a counter-current vertical flow, the heat transfer characteristics are constant across any horizontal plane. The temperature of the coolant at the coolant outlet can therefore be higher and nearer to that of the bulk gas inlet. This effect is integrated throughout the condenser, and so the overall flow of coolant can be reduced, thereby saving pumping power. Some adverse effects may arise however if it is necessary to dilute the outlet flow with further coolant to reduce the discharge temperature to the local environment.

The upper ends of the vertical tubes could be connected to an outlet header above the tube nest which does not have to be thermally insulated from the bulk gas as its additional cooling effect could be beneficial. An inlet header at the bottom of the tube nest could be immersed in a condensate pool in order to cool the pool, thereby ensuring the accumulation of non-condensing gases adjacent the cooling pool. Alternatively, the inlet header could be thermally isolated if it was thought necessary to eliminate condensate sub-cooling in order to maintain desired control over the entire plant.

In an arrangement with vertical tubes relatively short tube lengths can be used and differential thermal movements will be reduced. This may make it possible to have an all-welded structure of coolant tubes. Thus in contrast to existing large scale designs where a large number of sliding joints are provided to accommodate differential thermal movement due to temperature changes, such sliding joints could be avoided. This would reduce the risk of leakage. It would also be easier to reduce the leakage of non-condensing gases into the condenser. Sub-assemblies could be welded in the factory and shipped to site to be welded together on-site. This would reduce the site works, and therefore reduce the construction time on-site. It would also enable the start of these civil works to be delayed, to suit the reduced mechanical site construction activities of condenser assembly. The overall cost of the design would therefore be substantially reduced.

Figure 17:
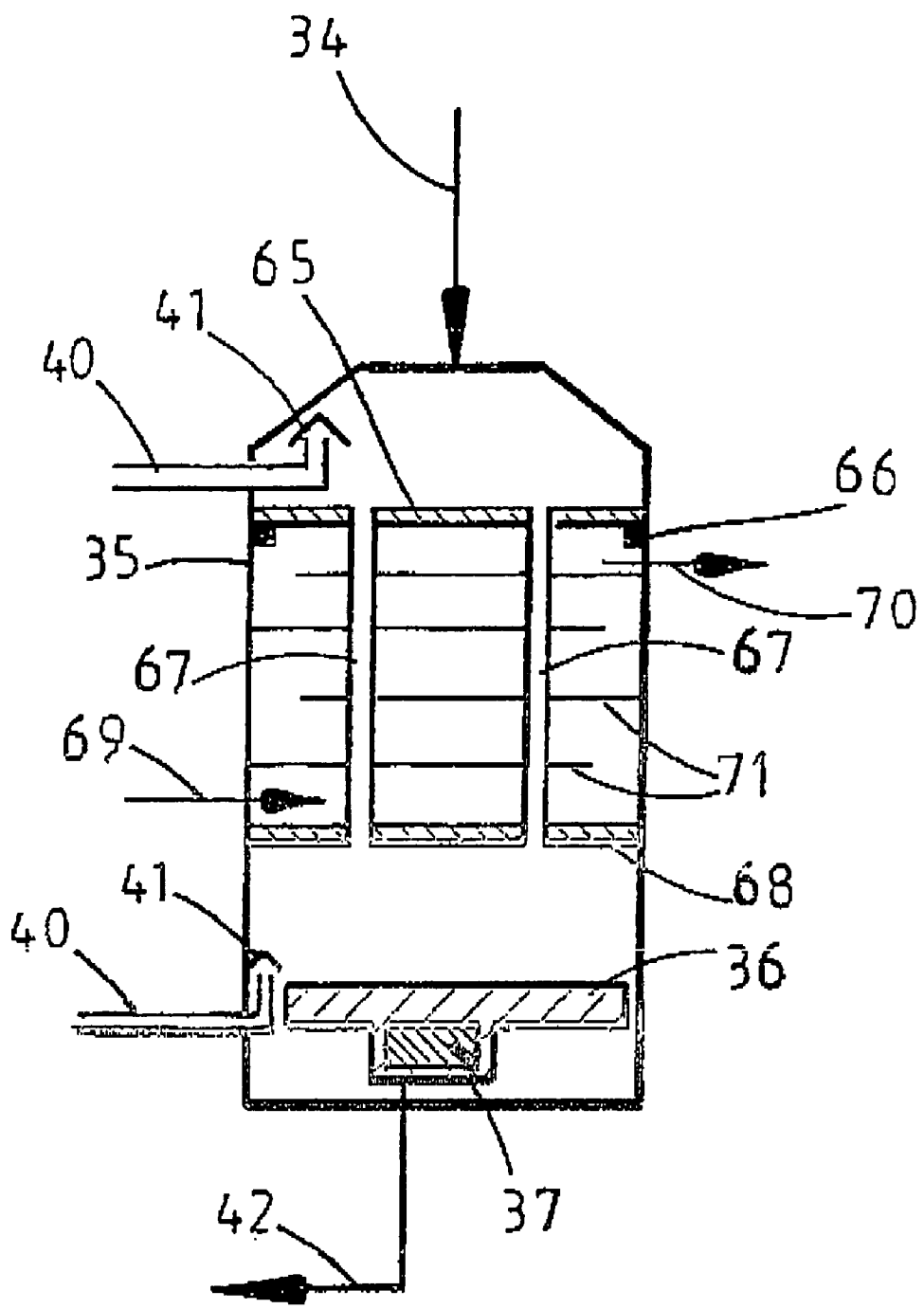
FIG. 17 schematically represents the overall structure of a modified steam condensing plant utilising vertical tubes in another embodiment of the present invention.

In an alternative arrangement with vertical tubes the incoming air and steam flow is internal to the tubes. FIG. 17 illustrates such an arrangement. An incoming air and steam flow is represented by arrow 34. The incoming flow 34 is incident upon an upper tube plate 65. Tube plate 65 is supported by (and sealed to) an annular support 66 extending around the interior of the outer body 35. The incoming flow passes through an array of vertical tubes 67 forming a single tube nest. The upper ends of the tubes are sealed to the upper tube plate 65, such that the tubes 67 connect with the upper part of the condenser. The lower ends of the tubes 67 are sealed to a lower tube plate 68, such that the tubes 67 connect with the lower part of the condenser allowing process fluid to flow through the tubes. An array of baffles 71 are incorporated into the volume between the upper and lower tube plates. These extend partway transverse the condenser, e.g. across the width of the condenser. The array of baffles is staggered, with alternate baffles extending from opposite sides of the condenser. The baffles 71 define an array of parallel heat exchanger conduits. Coolant is passed into the conduits at a lower inlet 69 and exits via an upper outlet 70. The conduits extend in series, such that coolant will flow in one direction along a first of the conduits, and in the opposite direction along the next, adjacent conduit. Condensate condenses on the inside of tubes 67. Condensate then collects in a condensate pool 36. The condensate pool 36 is in contact with a heat exchanger 37 to cool the condensate, as described above in relation to FIG. 12. Similarly a condensate outlet 42 is provided.

Non condensing gas outlets 40 are incorporated both in the volume above upper tube plate 65 and in the volume below lower tube plate 68. Incorporating a non condensing gas outlet 40 in the volume above upper tube plate 65 allows the counteraction of any leakage of air into this portion of the condenser through outer body 35. Additionally, this non condensing gas outlet 40 can also serve to maximise the condensation in the tubes. Non condensing gas outlet 40 in the volume below the lower tube plate 68 allows air to be removed on start up of the condensation process, and the counteraction any leakage of air into this portion of the condenser through outer body 35.

Both non condensing gas outlets 40 are shown in conjunction with droplet deflectors 41 as described above in relation to FIG. 12. It will be appreciated that this outlet design may be replaced by the non condensing gas outlet of FIG. 11.

This alternative arrangement simplifies the layout for the attachment of the upper ends of the tubes. Having the tubes connected via a single tube plate at each end obviates the need to either have multiple tubes exiting through the wall of the condenser, or a complex tube combiner inside the condenser. This also considerably reduces the size of the volume to be sealed against ingress of air. Only the volume of the condenser above the upper tube plate 63 needs to be sealed against air ingress. As the majority of the condenser is at the temperature of the coolant rather than that of the air and steam flow, which may be variable, thermal expansion and contraction of the condenser is minimised.

A disadvantage of a vertical tube design is that the thickness of the condensate on the cooling tubes will increase with distance down the tubes. This therefore presents a greater resistance to the heat flux than for horizontal tube designs. In order to offset this, the tubes could be arranged so as to encourage the formation of droplets so that the droplets fall off the tube. For example, the tubes could be arranged at a small angle from the vertical. Alternatively or in addition the tube surfaces may be shaped to promote break-up of the condensate into droplets by surface roughening or the addition of short fins. A helical fin design could be considered.

In straight-through designs such as those illustrated with reference to FIGS. 12 to 15, the velocity of the bulk gas falls with distance from the bulk gas inlet. This reduces the velocity of the gas over the surfaces of the tubes. This makes it even more desirable to reduce the non-condensing gas mass fraction adjacent the tube surfaces as much as possible as the effect of the non-condensing gas is compounded by the reduction in gas velocity. The reduction in gas flow does however make it possible to insert grids or braces into the tube nest so as to support the tubes and reduce their tendency to vibrate in the gas flow. Such grids or braces would be a suitable place to locate local non-condensing gas extraction devices as this would be convenient in terms of the overall structure of the design and the devices would be ideally located for the removal of non-condensing gases.

Figure 16:
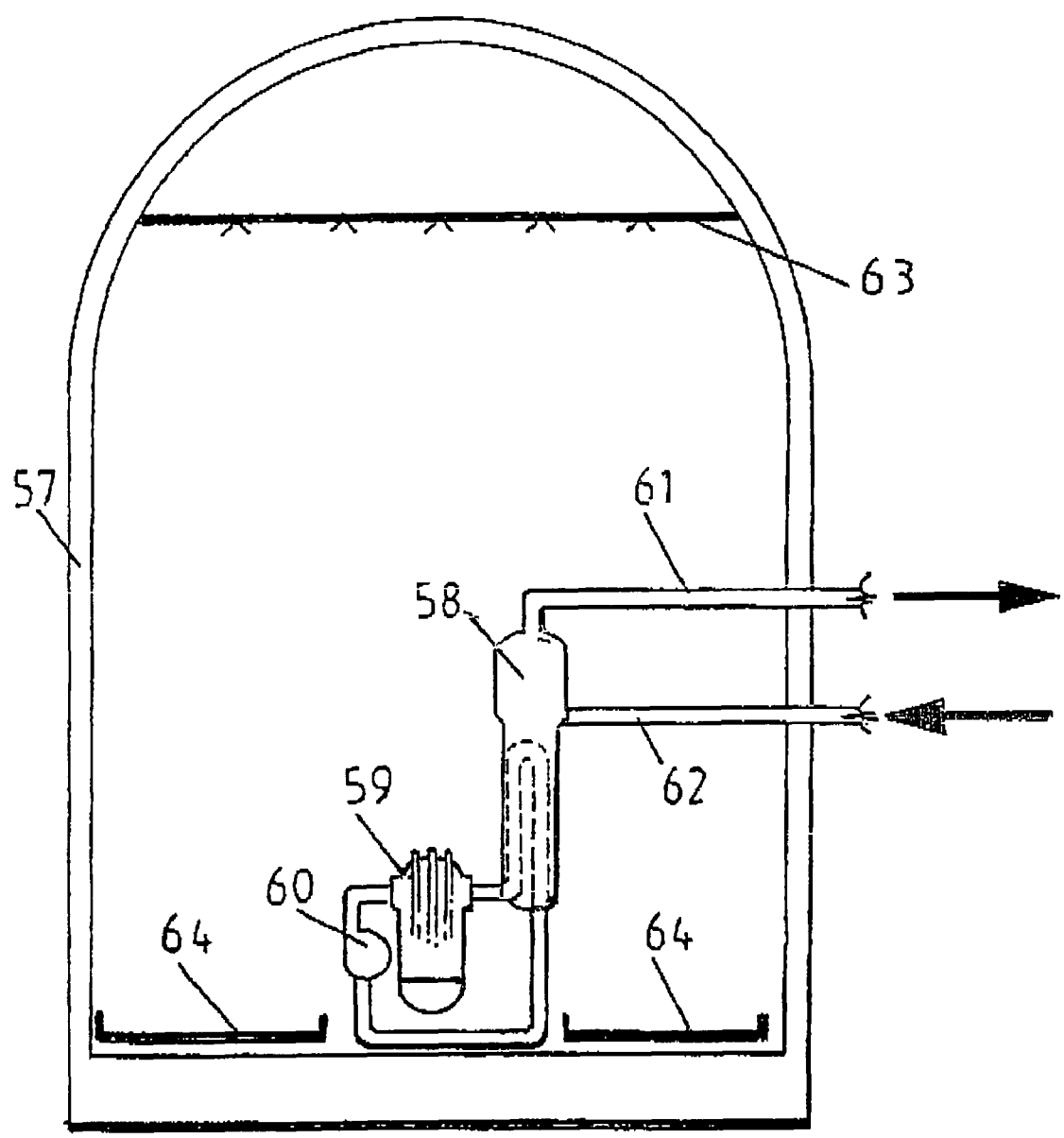
FIG. 16 represents the application of a still further embodiment of the present invention to a containment vessel such as that used in a nuclear power station.

Referring now to FIG. 16, this schematically illustrates a containment vessel of a water-cooled nuclear reactor. The containment vessel has an outer wall 57 which is intended to prevent the release of gas to the local environment in the event of an excess pressure building up within the containment vessel. Housed within the containment vessel are a steam generator 58, a nuclear reactor 59 and a reactor coolant pump 60. The steam generator delivers steam to a turbine (not shown) through pipe 61 and receives condensate from the turbine through pipe 62.

Spray heads 63 are located in an upper section of the containment vessel. Large surface area trays 64 are provided on the floor of the containment vessel such that condensate formed within the containment vessel will accumulate in those pools.

Were there to be a leakage of steam into the containment vessel, this would increase the pressure throughout the containment vessel. In designing such containment vessels, the current accepted practice is to consider the gas mixture within the containment vessel as being uniformly mixed. A heat transfer correlation is then applied to the entire surface area to determine the rate at which steam will condense out, thereby reducing pressure within the containment vessel. The size of the containment vessel is made sufficiently large to ensure that the pressure never exceeds a predetermined maximum given the assumed design constraints. As a result the containment vessels are extremely large, making it very difficult indeed to for example bury them in the ground, and the size of containment vessels is a significant factor in terms of economic cost.

The understanding of condensation processes upon which the present invention relies makes it possible to reconsider the accepted teaching with regard to the design of containment vessels. In particular, the non-uniformity of the local air concentration means that the pressure within the containment vessel will be significantly lower than that assumed in accordance with current design practice.

In a situation in which steam leaks into the containment vessel of FIG. 16, steam would rise towards the top of the containment vessel due to buoyancy forces arising from temperature differences between the steam and the air previously occupying all of the containment vessel. The steam would then condense and water droplets would begin to fall through the space defined within the containment vessels. If as shown in FIG. 16 trays 64 are provided a horizontal surface of coolant would be defined within the trays once the trays were partially filled with condensate. The gas just above the surface of the coolant in the trays 64 would be cooler than that at the top of the containment vessel and therefore the air concentration adjacent the coolant would be significantly higher than at the top of the containment vessel. This would mean that the local heat transfer coefficient at the top of the containment vessel, which would determine the rate at which steam condenses out, would be enhanced at the top of the containment vessel. Given the exponential nature of the relationship that is illustrated in FIG. 1, the pressure developed within the containment vessel (which would of course be uniform throughout the vessel) would be lower than predicted by current design predictions. Therefore future nuclear power containment vessels could be considerably smaller than previously contemplated, significantly affecting the choices available to the designers of such plant. Alternatively, maintaining conventional dimensions for containment vessels would result in increased safety margins.

The above discussion related to FIG. 16 assumes as in the case of the currently accepted design calculations that conditions within the containment vessel would result in heat transfer coefficients associated with free convection. In fact, in the event of a substantial leakage of steam the heat transfer regime would be forced convection and therefore still further reductions in the adverse effects of high air fractions could be expected.

In the arrangement of FIG. 16 the provision of schematically illustrated trays 64 is indicated as providing a way to produce large surface area pools of condensate. These trays could for example be defined by relatively small (in the vertical direction) formations on a floor across which personnel normally simply walk. The effect of having a pool of condensate on the peak pressure within the containment vessel could be further enhanced by ensuing a very rapid formation of a pool of coolant rather than waiting for a pool of coolant to accumulate as a result of steam condensation. For example, a tank of water could be provided which would be rapidly discharged into a tray such as that shown in FIG. 16 as soon as the pressure within the containment vessel exceeded a predetermined threshold.

Some embodiments of the present invention relate to condensers which typically are provided for the express purpose of converting a gas to a condensate. There are however some situations in which apparatus is manufactured which is not typically referred to as a "condenser" but which relies upon condensation processes and it is the intention that the present invention should encompass such apparatus. For example, sterilisers are widely used which rely upon the injection of steam into an enclosure to sterilise both the enclosure and articles placed within that enclosure. Typically, the enclosure is initially filled with air and a predetermined time is specified for purging the air by injecting sufficient steam so that the initial atmosphere of air within the enclosure at ambient pressure is converted to pressurised saturated steam. As steam is injected, the interior of the enclosure is pumped out or simply vented to atmosphere to remove air. In conventional sterilisers, the air off-take pipe is located at the top of the enclosure. As a result the process of evacuating air from the enclosure is relatively slow. If the air off-take was located so as to extract gas from a region within the enclosure which is at a relatively low temperature, for example a region adjacent the bottom of the steriliser or adjacent a cooling device provided to produce a localised region of low temperature, the rate at which air could be removed from the steriliser would be significantly increased. This in turn would reduce the period for the purging process.

Thus in the case of a steriliser as discussed above, another embodiment of the invention applies the same principle to the extraction of unwanted non-condensing gases as is applied in the case of condensers for steam in electric power generation plant. The same principles can of course be applied in apparatus other than sterilisers, for example heat exchangers in oil refineries or other chemical engineering plant where there is a need to remove non-condensing gases from a mixture of condensing and non-condensing gases.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A method for removing non-condensing gas from a mixture of condensing and non-condensing gases in a condenser having main heat exchanging surfaces for condensing the condensing gas into a liquid, the method comprising:
    providing an auxiliary cooling surface in the condenser spaced from the main heat exchanging surfaces;
    using the auxiliary cooling surface to provide within the condenser at least one cool region of gas in said mixture of condensing gas and non-condensing gases,
    wherein the gases in said cool region are at a temperature which is lower than the temperature of the gases in other regions of the condenser,
    and wherein the gases in said cool region comprise a high mass fraction of non-condensing gas when compared to the mass fraction of non-condensing gas in other regions of the condenser; and
    withdrawing gas from said at least one cool region of gas.

2. A condenser for condensing gas, the condenser comprising:
    a heat exchanging surface for condensing a condensing gas to a liquid;
    a cooling means spaced from the heat exchanging surface for producing a localized region of relatively cold gas, wherein the gas in the localized region of relatively cold gas is at a temperature which is lower than the temperature of gas in other regions within the condenser and which comprises a higher mass fraction of non-condensing gas; and
    means for withdrawing gas from the localized region of relatively cold gas.

3. A condenser according to claim 2, wherein the cooling means comprise a heat exchanger on which gas condenses.

4. A condenser according to claim 2 wherein the cooling means comprises means positioned to be cooled by condensing liquid.

5. A condenser according to claim 4, wherein the cooling means comprises at least one deflector located beneath the heat exchanging surface such that droplets of liquid fall onto and cool the deflector, the gas withdrawing means extracting air from beneath the deflector.

6. A condenser according to claim 5, wherein said at least one deflector comprises a cover extending over an upwardly extending gas withdrawal pipe.

7. A condenser according to claim 5, wherein said at least one deflector comprises an elongate gas withdrawal duct a lower side of which defines apertures through which gas is withdrawn into the elongate duct.

8. A condenser according to claim 5, wherein said at least one deflector comprises an elongate duct an underside of which defines an open channel, the gas withdrawing means being connected to one end of the elongate duct.

9. A condenser according to claim 7 wherein the elongate duct extends beneath and in parallel with a heat exchanger tube of the condenser.

10. A condenser according to claim 5 wherein a shield is located above the deflector to shield falling droplets of condensate from gas flowing through the condenser.

11. A condenser according to claim 2, wherein the cooling means comprises a surface which is configured to be cooled by a flow of coolant.

12. A condenser according to claim 11, wherein the surface of the cooling means is configured to be cooled by a flow of coolant to a temperature lower than any heat exchange surface within the condenser.

13. A condenser according to claim 11, wherein the cooling means comprises primary and secondary heat exchangers both defining heat exchange surfaces, the heat exchange surface of the primary heat exchanger being located upstream of the heat exchange surface of the secondary heat exchanger in the flow of gas to be condensed, and the secondary heat exchanger being cooled to a lower temperature than the primary heat exchanger.

14. A condenser according to claim 13, wherein the primary and secondary heat exchangers are cooled by flows of coolant derived from separate sources, the coolant of the secondary heat exchanger being at a lower temperature than the coolant of the first heat exchanger.

15. A condenser according to claim 2 comprising an auxiliary heat exchanger within the condenser, and means for pumping condensed liquid through the auxiliary heat exchanger, the auxiliary heat exchanger being located such that the condensed liquid within it is heated by the gas to be condensed.

16. A condenser according to claim 15, wherein the auxiliary heat exchanger is located upstream of the said heat exchanging surface in the flow of gas to be condensed.

17. A condenser according to claim 11, wherein the cooled surface is defined by a pool of condensed liquid in thermal contact with a cooling device.

18. A condenser according to claim 11, wherein the cooled surface is defined by a wall of the condenser in thermal contact with a cooling device.

19. A condenser according to claim 18, wherein the condenser wall is defined by a cover plate which covers an aperture in the condenser, gas being withdrawn through the cover plate.

20. A condenser according to claim 19, comprising means for monitoring the pressure and temperature of gas adjacent the cover plate, and means for controlling the cooling means to maintain the temperature of the cover plate above the freezing point of the condensed liquid.

21. A method for reducing the concentration of non-condensing gas from a mixture of condensing and non-condensing gases in a condenser, comprising:

providing a condenser to cool a mixture which includes a condensing gas and a non-condensing gas, wherein the condenser includes main heat exchanging surfaces for condensing the condensing gas into a liquid and an auxiliary cooling surface spaced from the main heat exchanging surfaces;

flowing the mixture within the condenser;

cooling the flowing mixture in the condenser;

using the auxiliary cooling surface to provide at least one region of relative low mixture temperature within the condenser, the region having relative high concentration of the non-condensing gas;

using the main heat exchanging surfaces to form condensate in the condenser at locations that are spatially separated from said region; and withdrawing gas from said region to reduce the overall concentration of the non-condensing gas in the condenser.

22. An apparatus for condensing gas to liquid, comprising:

a condenser for removing heat from a gas, said condenser having an interior with a main heat exchanging surfaces for condensing gas to a liquid and an auxiliary cooling surface spaced from the main heat exchanging surfaces for producing at least one region of relative low temperature during operation of said condenser, said region being spatially separated from formed condensate during operation of said condenser; and means for withdrawing gas from said region of said condenser to reduce the concentration of a non-condensing gas in the condenser.

* * * * *

UNITED STATES PATENT AND TRADEMARK OFFICE
CERTIFICATE OF CORRECTION

| | | |
|---|---|---|
| PATENT NO. | : 7,780,767 B2 | |
| APPLICATION NO. | : 10/553541 | |
| DATED | : August 24, 2010 | |
| INVENTOR(S) | : James Andrew Robinson | |

It is certified that error appears in the above-identified patent and that said Letters Patent is hereby corrected as shown below:

On the Title page, Item (76) of the patent, please correct the spelling of the inventor's residence city to --Prestbury--. Please also correct the inventor's zip code to --SK10 4UX--

Signed and Sealed this

Thirtieth Day of November, 2010

David J. Kappos
*Director of the United States Patent and Trademark Office*